(12) United States Patent
Yamakawa et al.

(10) Patent No.: US 6,373,060 B1
(45) Date of Patent: Apr. 16, 2002

(54) NUCLEAR MEDICINE DIAGNOSTIC APPARATUS

(75) Inventors: Tsutomu Yamakawa; Mikio Igarashi, both of Tochigi-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/239,968

(22) Filed: Jan. 29, 1999

(30) Foreign Application Priority Data

Jan. 30, 1998 (JP) .......................................... 10-019662
Jan. 21, 1999 (JP) .......................................... 11-013480

(51) Int. Cl.⁷ ............................................. G01T 1/166
(52) U.S. Cl. ............................. 250/363.08; 250/363.05
(58) Field of Search ....................... 250/363.02, 363.05, 250/363.08

(56) References Cited

U.S. PATENT DOCUMENTS

| | | | | |
|---|---|---|---|---|
| 4,580,219 A | * | 4/1986 | Pelc et al. ..................... 378/4 |
| 5,047,641 A | * | 9/1991 | Besseling et al. ....... 250/363.05 |
| 5,059,799 A | * | 10/1991 | Kurakake .............. 250/363.08 |
| 5,093,575 A | * | 3/1992 | Perusek ................. 250/363.08 |
| 5,097,131 A | * | 3/1992 | Plummer et al. ....... 250/363.08 |
| 5,171,998 A | * | 12/1992 | Engdahl et al. ........ 250/363.02 |
| 5,717,212 A | * | 2/1998 | Fulton et al. .......... 250/363.05 |
| 6,114,701 A | * | 9/2000 | Plummer et al. ....... 250/363.05 |

* cited by examiner

Primary Examiner—F. L. Evans
(74) Attorney, Agent, or Firm—Oblon, Spivak, McClelland, Maier & Neustadt, P.C.

(57) ABSTRACT

A nuclear medical diagnostic apparatus for detecting gamma rays emitted from the radio isotope (RI) administered to a subject, to generate images showing the functions of the subject, such as metabolism. In the nuclear medical diagnostic apparatus, at least one detector is attached to a rotating ring and located inside the ring. The apparatus can therefore be modified as a one-detector type to a four-detector type. It can easily be graded up from a one-detector type to any one of the other types including the four-detector type. Further, the image-generating mode can be freely changed. Moreover, the apparatus can be small and light.

38 Claims, 20 Drawing Sheets

NUCLEAR MEDICINE DIAGNOSTIC APPARATUS

BACKGROUND OF THE INVENTION

The present invention relates to a nuclear medical diagnostic apparatus, both designed to detect, in one- or two-dimensional fashion, the radiation, such as gamma rays, emitted from the radio isotope (RI) administered to a subject, and to determine an RI distribution in the subject.

Nuclear medical diagnostic apparatuses are classified into a type which detects a single photon and another type which detects positrons. The first type generates an RI distribution by using a single photon (gamma ray) which single-photon type RI releases when it decays. The second type generates an RI distribution by using a pair of photons which are released when an IR positron annihilates.

The recent main medical diagnostic apparatus of single photon type is SPECT (Single Photon Emission Computed Tomography) apparatus. A wide line-up of SPECT apparatus is available at present, from one-detector type to four-detector type. Among the two-detector types developed is one in which the two detectors can take various positional relations, such as 180° opposed arrangement and 90°-interval arrangement.

The one-detector type to the four-detector type best operate in different conditions. It is therefore desired that all these types be installed. This cannot be possible, however, because much cost and space are required.

The users have been strongly demanding for an apparatus that can perform the functions of the one-detector type to the four-detector type. The users have also been earnestly demanded for an apparatus that can be graded upward, first from one-detector type to two-detector type, then to three-detector type, and finally to four-detector type.

Conventional nuclear medical diagnostic apparatuses have some disadvantages, which will be described. FIG. 1A is a side view of a conventional nuclear medical diagnostic apparatus which has two radiation detectors. FIG. 1B is a front view of the apparatus as seen in the direction of arrow a shown in FIG. 1A. This conventional apparatus comprises a gantry 201, gantry rails 202, two Auger-type radiation detectors 203 and 204, arms 205a and 205b, a bed 206, and bed legs 207. The gantry 201 can move on the rails 202. The detectors 203 and 204 are arranged, opposing each other such that a patient may lie between them. The arms 205a and 205b are secured to the gantry 201 and hold the detectors 203 and 204, respectively. The bed 207 has a top plate 206a on which a patient may lie. The bed legs 207 support the bed 206.

The radiation detectors 203 and 204 weigh about 200 kg to 400 kg each. The total weight of the gantry 1 and the arms 205a and 205b holding the radiation detectors 203 and 204 is 1,500 kg to 2,000 kg. It is difficult to tilt the gantry 201, which is so heavy. Hence, the patient usually climbs onto the top plate 206a of the bed 206 as shown in FIGS. 1A and 1B, and images are formed after the patient is led into a dome 208.

In the medication examination using a conventional SPECT or PET apparatus, tomograms are formed while the patient is lying on the bed.

Positions the patient may take to obtain various tomograms are limited. A tomogram of the heart, for example, may be obtained by the use of a SPECT apparatus. If the arm overlaps the heart, it will absorb the radiation emitted from the apparatus. Consequently, the tomogram of the heart will be deteriorated. To prevent this, the patient on the top plate 206a shown in FIG. 1A must place his or her head on the right-end part of the plate 206a and both arms placed above his or her head. In this-position, neither arm overlaps the heart. (That is, neither arm is located between the heart and the radiation detector 203 or the radiation detector 204.) To remain in this position for a long time is very hard for the patient.

The top plate 206a on which the patient lies is thick and absorbs many gamma rays. Here rises the problem that the image obtained is deteriorated.

While the patient lies on the top plate, the liver and the heart are located close to each other. The radiation emanating from the liver adversely influences the tomogram of the heart, as is known in the art. Hence, it is very difficult to install an ergometer in order to carry out a stress test on the heart.

To acquire SPECT data from the head, the patient on the top plate 206a needs to place his or her head on the head rest (not shown) which is secured to the elevated part 206a' part, or a left part (FIG. 1A), of the top plate 206a. Then, the gantry 201 is moved until the radiation detectors 203 and 204 reach a position where the detectors can acquire data from the head. Once the radiation detectors 203 and 204 have been located near the head of the patient, the patient may likely to feel as if pressed or blocked. Inevitably the patient remains stressed during the acquisition of data. He or she can hardly be mentally relaxed and therefore cannot be tested for the function of his or her head.

To acquire mammo SPECT data or data representing still images of the breasts of a female patient, the radiation detector must be moved around the patient's breasts. The positioning of the radiation detector is limited since the end of the effective view field of the detector is spaced from the outer surface thereof, by a distance of 40 mm or more. Practically it is impossible to move the radiation detector.

If the distance between the end of the effective view field of the radiation detector and the outer surface of the detector is short, the gantry cannot be tilted. Therefore, no data can be acquired from the breasts while the patient is lying on her stomach. It is impossible to position the patient so that mammo SPECT data may be acquired from the breasts.

With the conventional nuclear medical diagnostic apparatus having two radiation detectors, it is impossible to obtain still images of the patient in sitting position, by the simultaneous use of both radiation detectors. This is because each radiation detector is far larger than its effective view field, and also because much restriction is imposed on mechanical driving of the gantry. In most cases, one radiation detector is held extending outwardly at 90°, and only the other radiation detector is moved around the patient to detect radiation.

BRIEF SUMMARY OF THE INVENTION

The first object of the present invention is to provide a nuclear medical diagnostic apparatus in which radiation detectors can be used in various numbers and the positional relation of the radiation detectors can be changed.

The second object of the invention is to provide a nuclear medical diagnostic apparatus which can acquire nuclear medical data about the various parts of a patient, such as the head and the heart, while the patient lies in a comfortable position.

In the present invention, a detector is provided inside a rotating ring. Therefore, the gantry can be made light.

Further, the number and positional relation of detectors used can be appropriately changed.

In the present invention, the gantry can be swiveled and tilted, and the position and posture of the detector can be changed with a high degree of freedom. Thus, the position and posture of the detector can be changed so that a patient may take a comfortable position.

In the present invention, the gantry can be swiveled and the detector can be moved along the axis of a patient. The position and posture of the detector can therefore be changed with a high degree of freedom. Thus, the position and posture of the detector can be changed so that a patient may take a comfortable position.

Additional objects and advantages of the invention will be set forth in the description which follows, and in part will be obvious from the description, or may be learned by practice of the invention. The objects and advantages of the invention may be realized and obtained by means of the instrumentatlities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Nuclear medical diagnostic apparatuses, which are the preferred embodiments of the present invention, will be described below with reference to the accompanying drawings.

First Embodiment

Figure 1A:
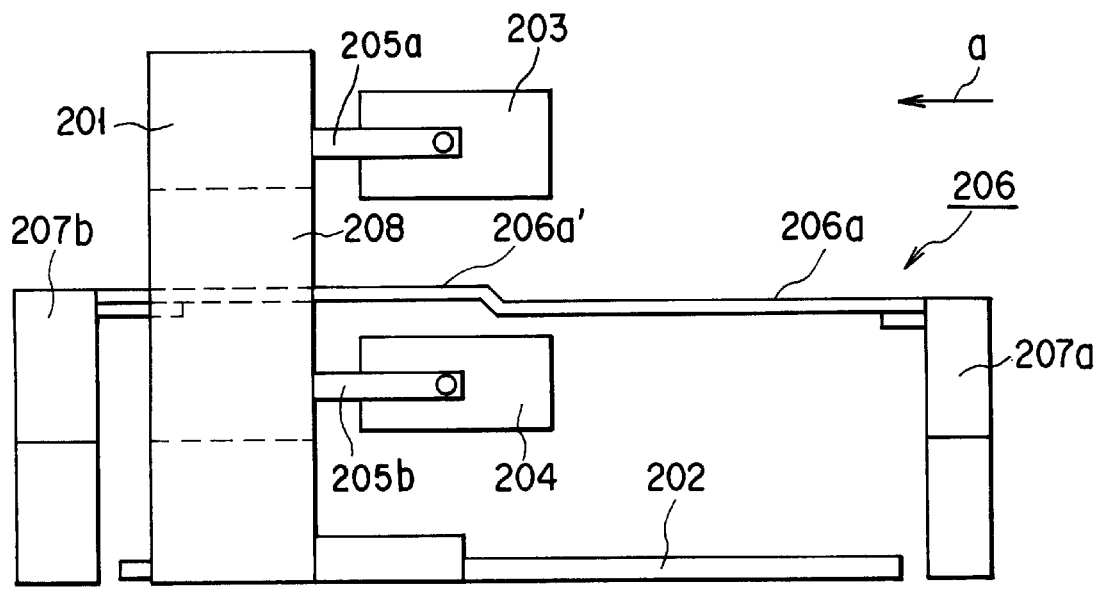
FIG. 1A is a side view of the radiation detecting system used in a conventional nuclear medical diagnostic apparatus.
Figure 1B:
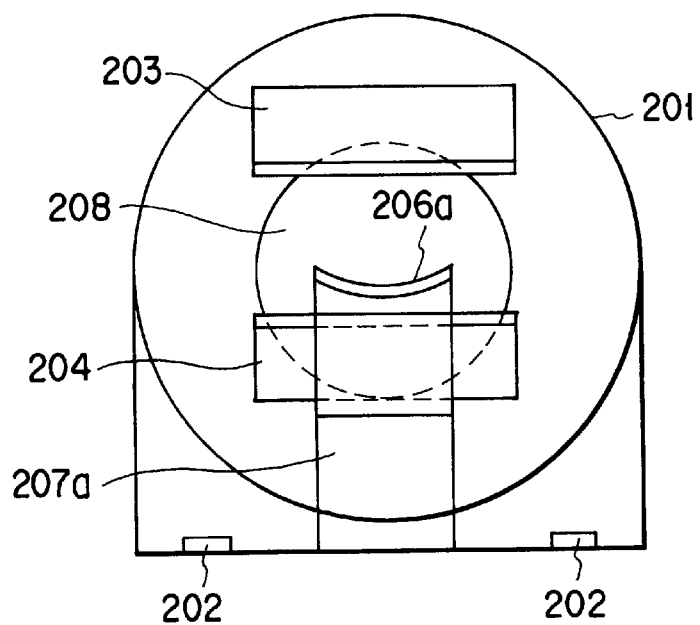
FIG. 1B is a front view of the radiation detecting system used in the conventional nuclear medical diagnostic apparatus.
Figure 2:
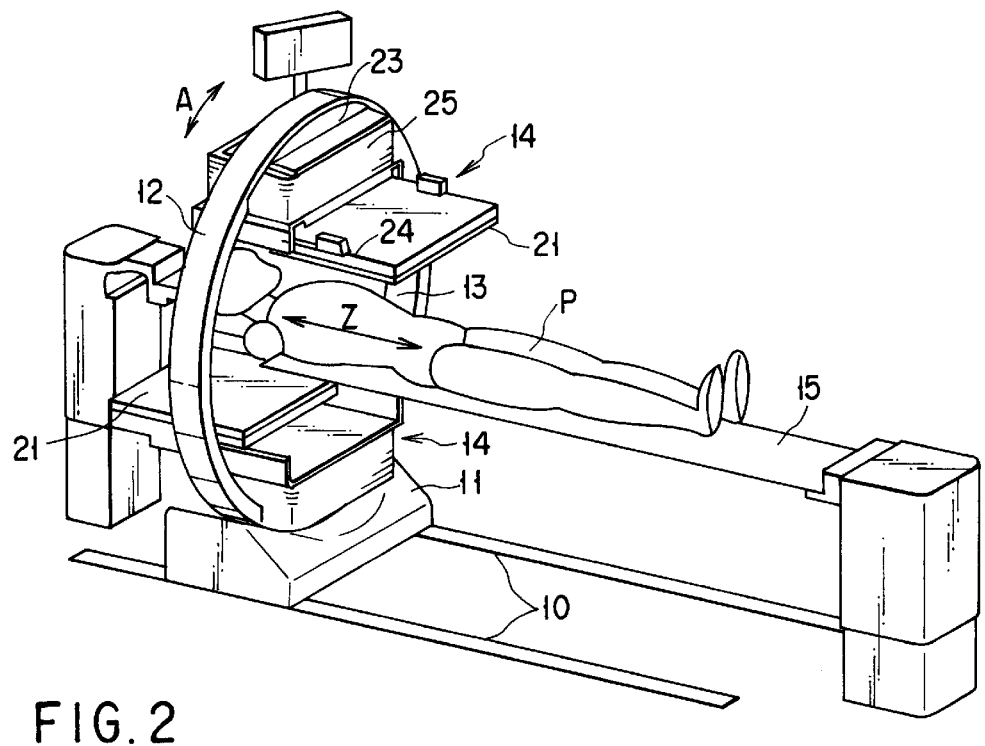
FIG. 2 is a perspective view of a nuclear medical diagnostic apparatus according to the first embodiment of the present invention.

FIG. 2 is a perspective view of a nuclear medical diagnostic apparatus according to this embodiment. A gantry base 11 is mounted on floor rails 10. A fixed ring 12 is secured to the gantry base 11. Inside the fixed ring 12 a rotating ring 13 is provided to rotate in a circumferential direction A. Z axis shown in FIG. 2 is an axis around which the rotating ring 12 can rotate.

Electrical connection of the fixed ring 12 and the rotating ring 13 is achieved by a spring which is not shown. A non-contact optical transfer system may be used to accomplish exchange of signals. A detector unit 14 is provided, which comprises a sliding base 23, a compact pantograph-type link mechanism 25, and a sliding mechanism 24. The detector unit 14 is provided inside the rotating ring 13 and is detachable. When a detector 21 remains at home position (normal position) in the sliding mechanism 24, it exists inside the rotating ring 13. In detail, a detector 21 exists at an inner side in a radial direction of the rotating ring 13, with its center of gravity located at an inner point on the axis of the rotating ring 13. When the sliding mechanism 24 slides the detector 21 slides from the home position, the center of gravity of the detector 21 moves to an outer point on the axis of the rotating ring 13. The sliding base 23 can be freely rotated and locked, with respect to the rotating ring 13.

The detector 21 is either semiconductor type or composite type. The semiconductor-type detector comprises a CdTe element or a CdZnTe element, which converts the gamma rays emanating from the RI administered to a subject, directly to an electric signal. The composite-type detector is composed of a photodiode and a scintillator and converts the gamma rays to light and then converts the light to an electric signal. A collimator, not shown in the drawing, is provided in front of the detector 21 to collimate the gamma rays. Since the detector 21 is semiconductor type or composite type, it is much smaller and lighter, 100 kg or less, than the conventional Auger-type detector and can yet have large view field, e.g., a 50 cm×38 cm view field.

Figure 3:
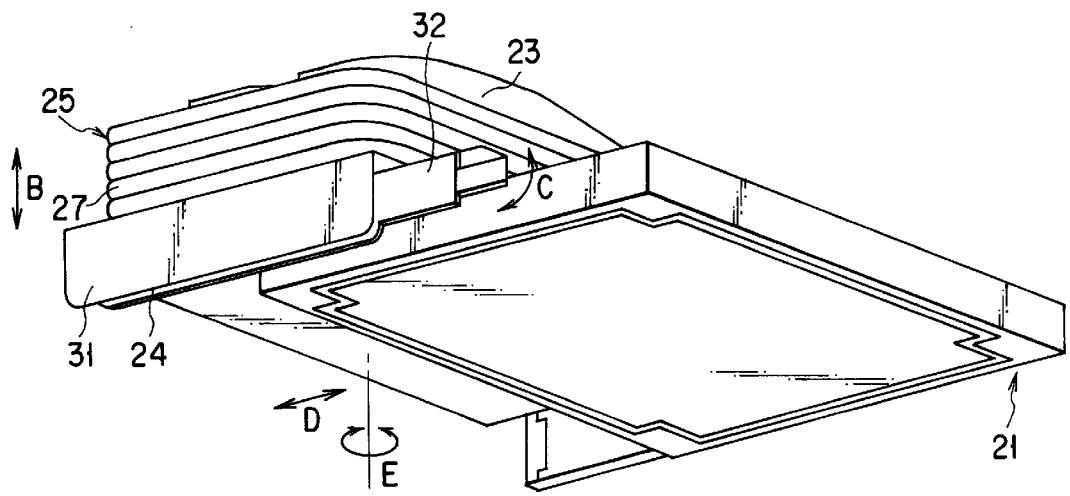
FIG. 3 is a perspective view of the detectors and the link mechanism, all shown in FIG. 2.
Figure 4:
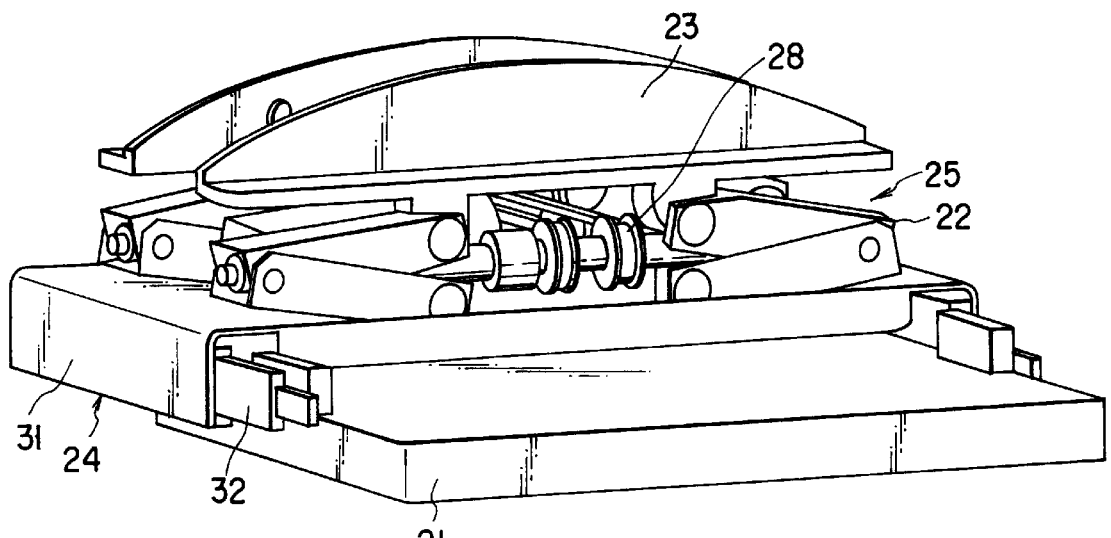
FIG. 4 is a perspective view of the link mechanism shown in FIG. 2.
Figure 5:
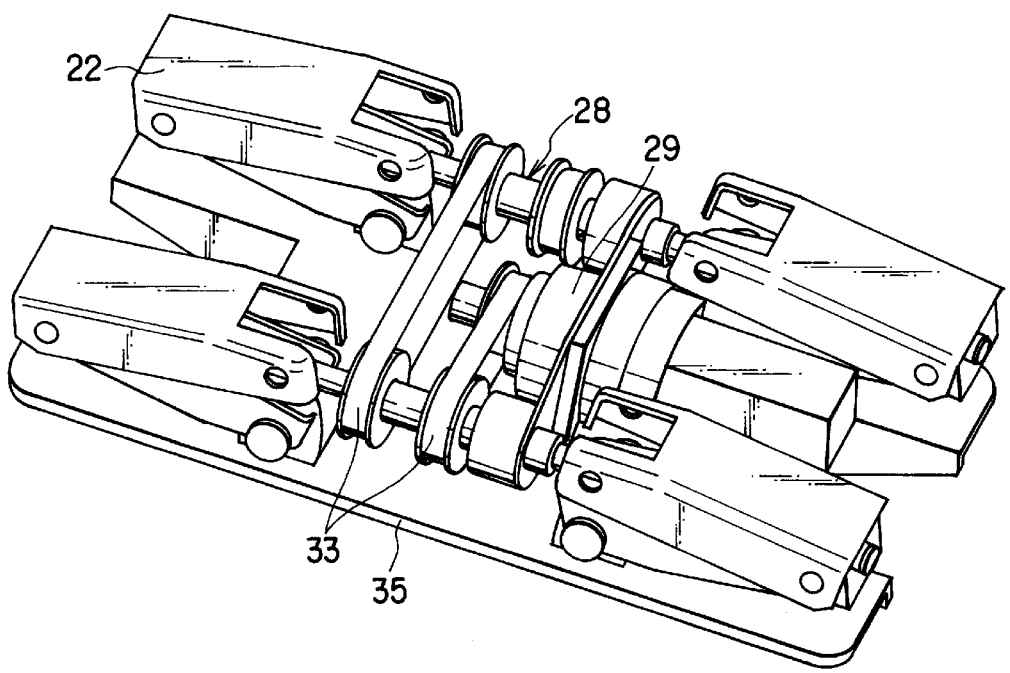
FIG. 5 is a perspective view of the link mechanism shown in FIG. 2.
Figure 6:
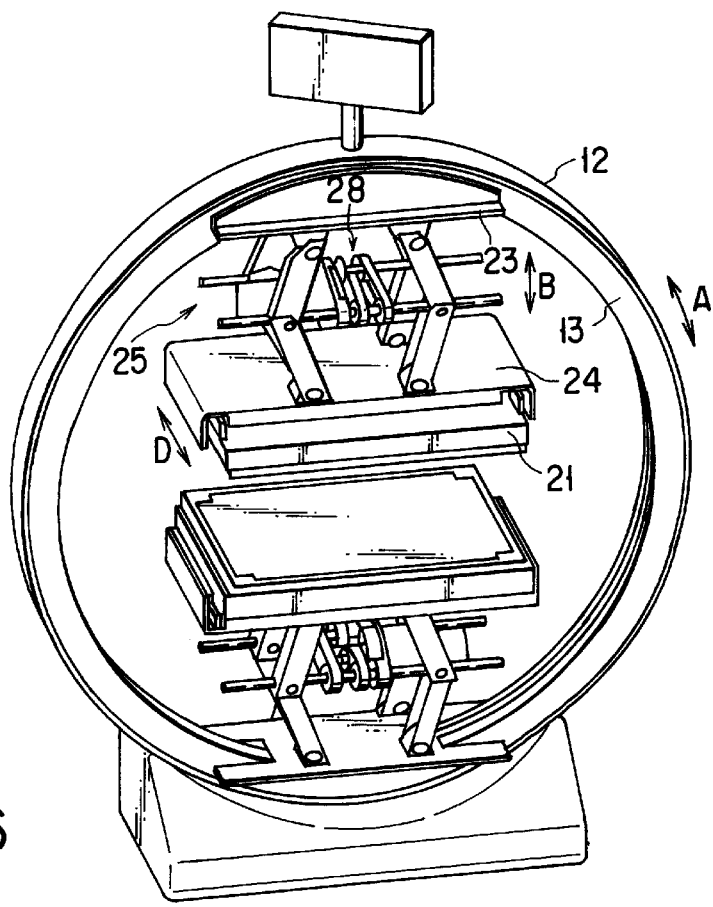
FIG. 6 is a perspective view of the link mechanism shown in FIG. 2.

FIGS. 3, 4 and 6 show the pantograph-type link mechanism 25 in detail. Illustrated in these figures are the protection cover 27 of the link mechanism 25 and the base 23 of the link mechanism 25. The link mechanism 25 comprises parts 22 linked together, forming a parallelogram link, and can expand and contract. The sliding mechanism 24 is attached to the link mechanism 25, and the detector 21 is attached to the link mechanism 25. When the link mechanism 25 is expanded or contracted, the detector 21 moves in a radial direction B of the rotating ring 13, toward or away from the axis of the rotating ring 13 (or the subject).

The link mechanism 25 can expand and contract as lead screw 28 is rotated. The screw 28 is electrically driven by means of a motor 29 and a transmission belts 33. The pantograph mechanism 25, lead screw 28, motor 29 and transmission belts 33 are provided in a bellows-like protective cover 27.

The sliding mechanism 24 is secured to the operation base 35 of the link mechanism 25 and can rotate in direction E. Sliders 32 are fitted in the slide rails of the sliding mechanism 24 and can slide in parallel to the Z axis. The detector 22 is attached to the sliders 32, can rotate in direction C, and can tilt to the Z axis.

Figure 20A:
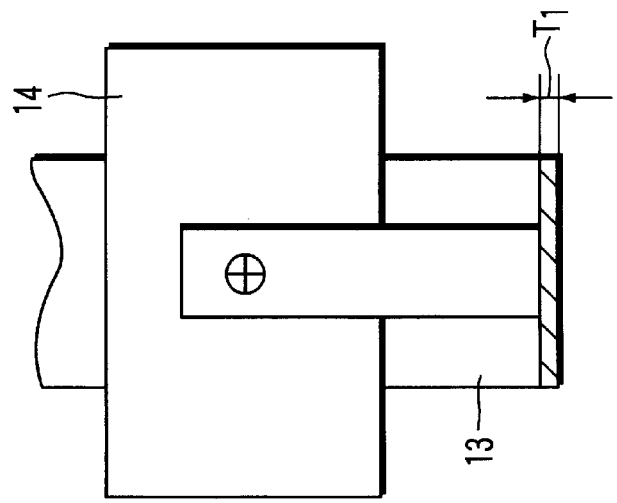
FIG. 20A is a diagram illustrating how thick the rotating ring should be in the nuclear medical diagnostic apparatus which is the first embodiment.
Figure 20B:
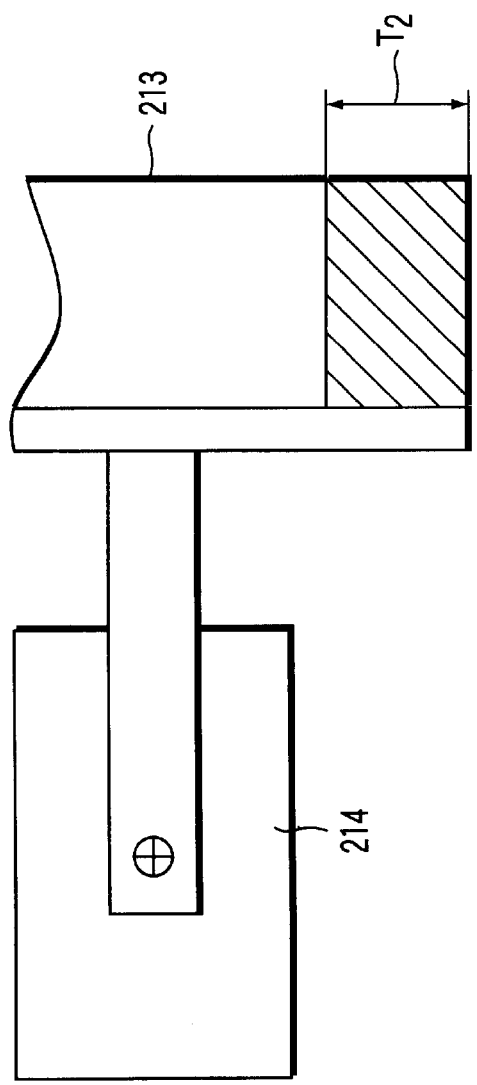
FIG. 20B is a diagram showing how thick the rotating ring should be in a conventional nuclear medical diagnostic apparatus.

Since the link mechanism 25 is used to move the detector 21 toward and away from the subject is a pantograph, it can provide desired strokes though it is compact. The mechanism for moving the detector 21 toward and away is not limited to the pantograph-type link mechanism 25. Any other mechanism can be used instead, only if it is compact. For example, a mechanism that can expand and contract may support the detector 21. Thus, as shown in FIGS. 16, 17A, 17B, 18A, 18B, 19A and 19B, the gantry 50 used in the present embodiment is much smaller than the conventional gantries 60 and 70. The detector unit 14 of this embodiment, shown in FIG. 20, is small and light, because the thickness T1 of the rotating ring 13 is, for example, about only one seventh ($\frac{1}{7}$) of the thickness T2 of the rotating ring 213 of the conventional detector unit 214 shown in FIG. 20B. Since the gantry is a frame structure, it does not make the patient feel overpowered so much, lessening the psychological stress on the patient.

Figure 7:
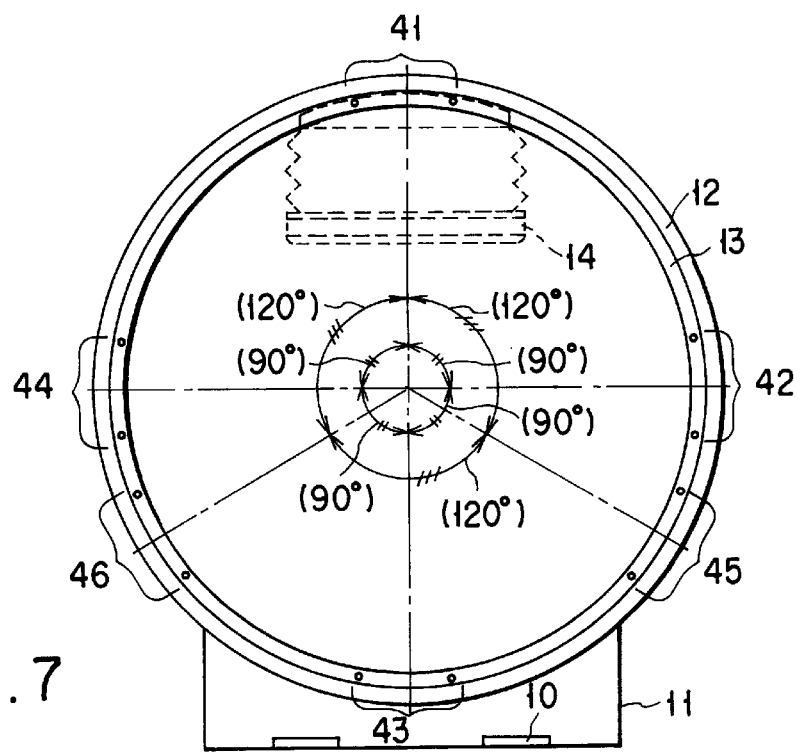
FIG. 7 is a diagram illustrating the arrangement of attachments provided on the rotating ring shown in FIG. 2.

In the present embodiment, the detector unit 14 is detachable with respect to the rotating ring 13. As shown in FIG. 7, six attachments 41, 42, 43, 44 and 46 are provided on the rotating ring 13, spaced apart one from another in the circumferential direction of the ring 13. The attachments 41 to 46 are, for example, pin holes. The sliding base 23 of the link mechanism 25 can be attached to any one of the attachments 21 to 46 by means of a lock pin. The link mechanism 25 can be removed from any one of the attachments 21 to 46.

The six attachments 21 to 46 are arranged as will be described below. The attachments 41, 42, 43 and 44 are spaced apart at intervals of 90°. The attachments 41, 45 and 46 are spaced apart at intervals of 120°. The lock mechanism is not limited to the lock pin. A clutch brake, for example, may be used instead. If this is the case, the detector 21 can be attached at any desired position.

Figure 8:
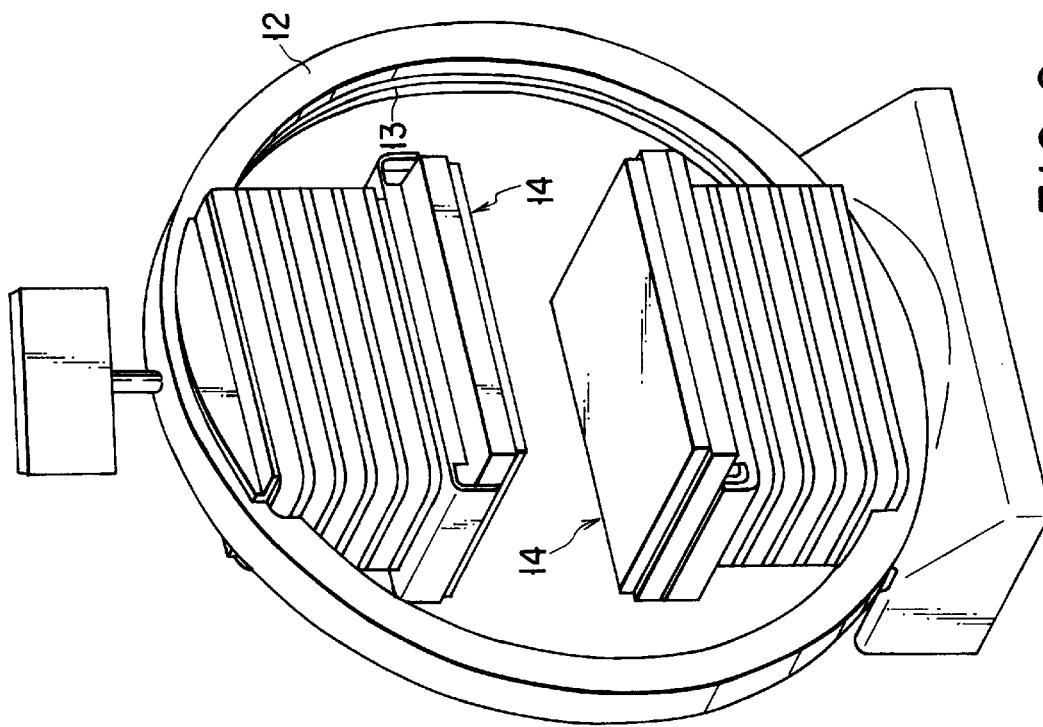
FIG. 8 is a perspective view of the nuclear medical diagnostic apparatus according to the first embodiment, which is set in the form of a one-detector type.
Figure 9:
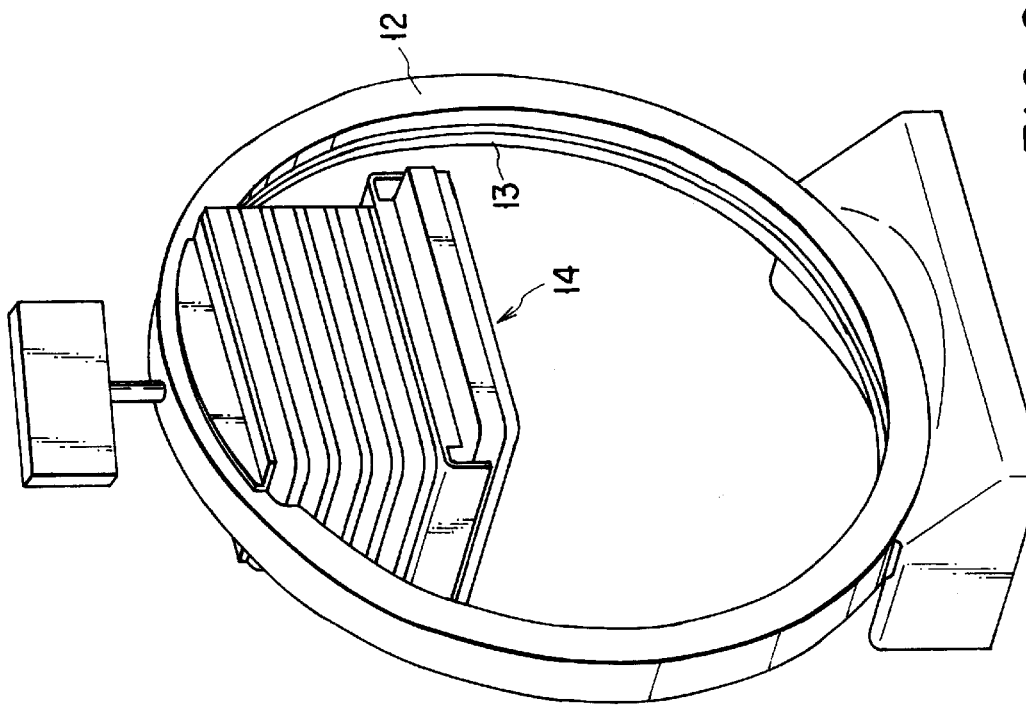
FIG. 9 is a perspective view of the nuclear medical diagnostic apparatus according to the first embodiment, which is set in the form of a two-detector type of opposition arrangement.
Figure 10:
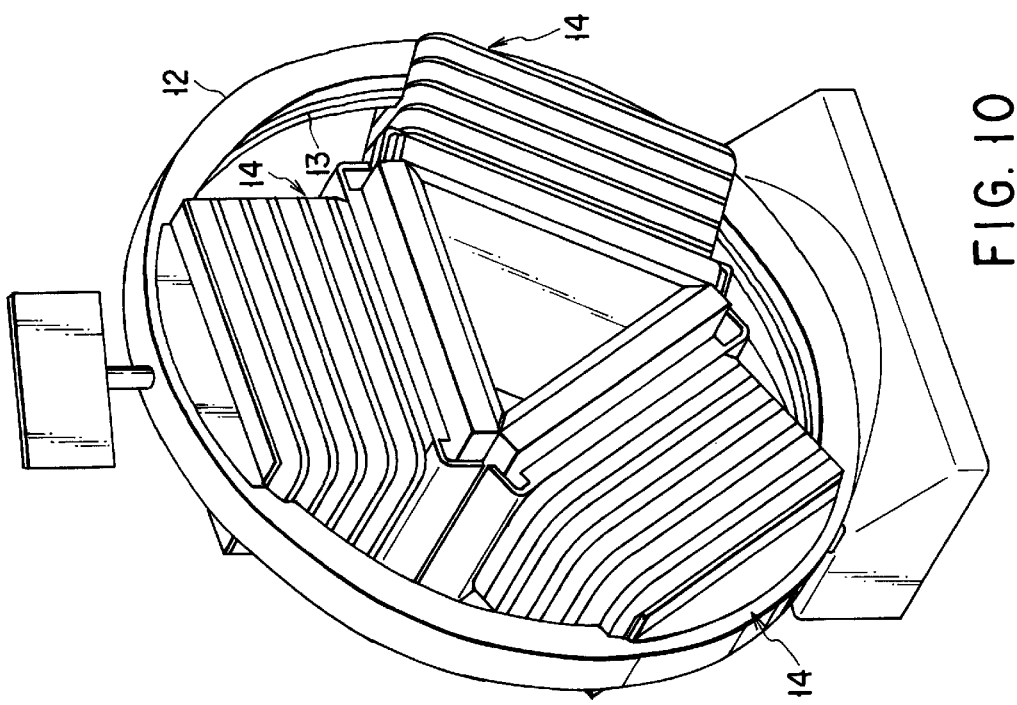
FIG. 10 is a perspective view of the nuclear medical diagnostic apparatus according to the first embodiment, which is set in the form of a three-detector type of triangle arrangement.

Thanks to the attachments 41–46 thus arranged, the apparatus can be modified to a one-detector type (FIG. 8), a two-detector type (FIG. 9), a three-detector type (FIG. 10), and a four-detector type. The detector unit 14 of the present embodiment is light and simple in structure and can, therefore, be easily installed in a hospital. By contrast, a conventional one-detector type apparatus, for example, can hardly be up-graded to a two-detector type or a three-detector type, one it has been installed in a hospital. Many man-hours would be required to modify the conventional apparatus. Thus, in many cases, the conventional apparatus is replaced with another type.

Figure 11:
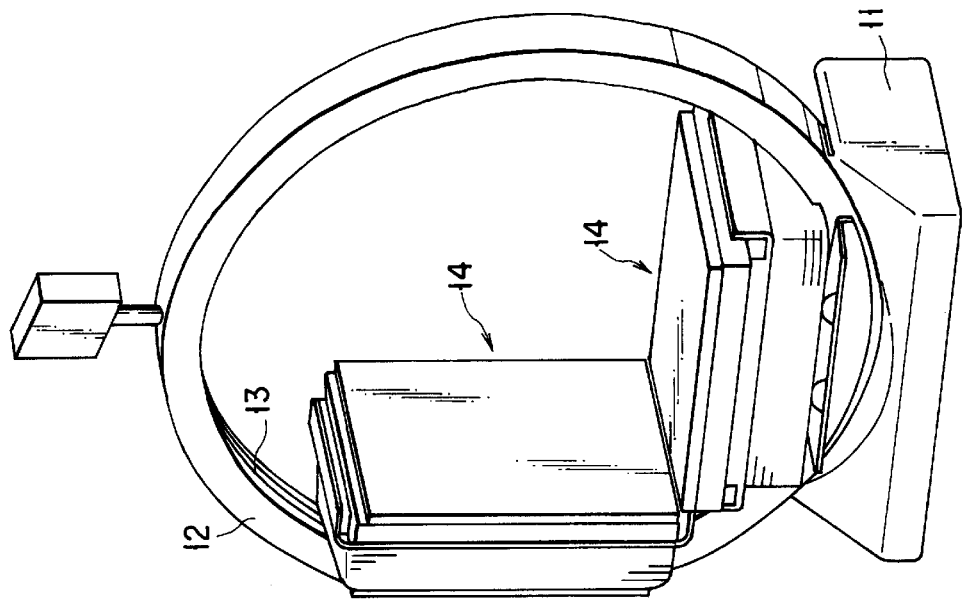
FIG. 11 is a perspective view of the nuclear medical diagnostic apparatus according to the first embodiment, which is set in the form of a two-detector type of 90°-interval arrangement.
Figure 12:
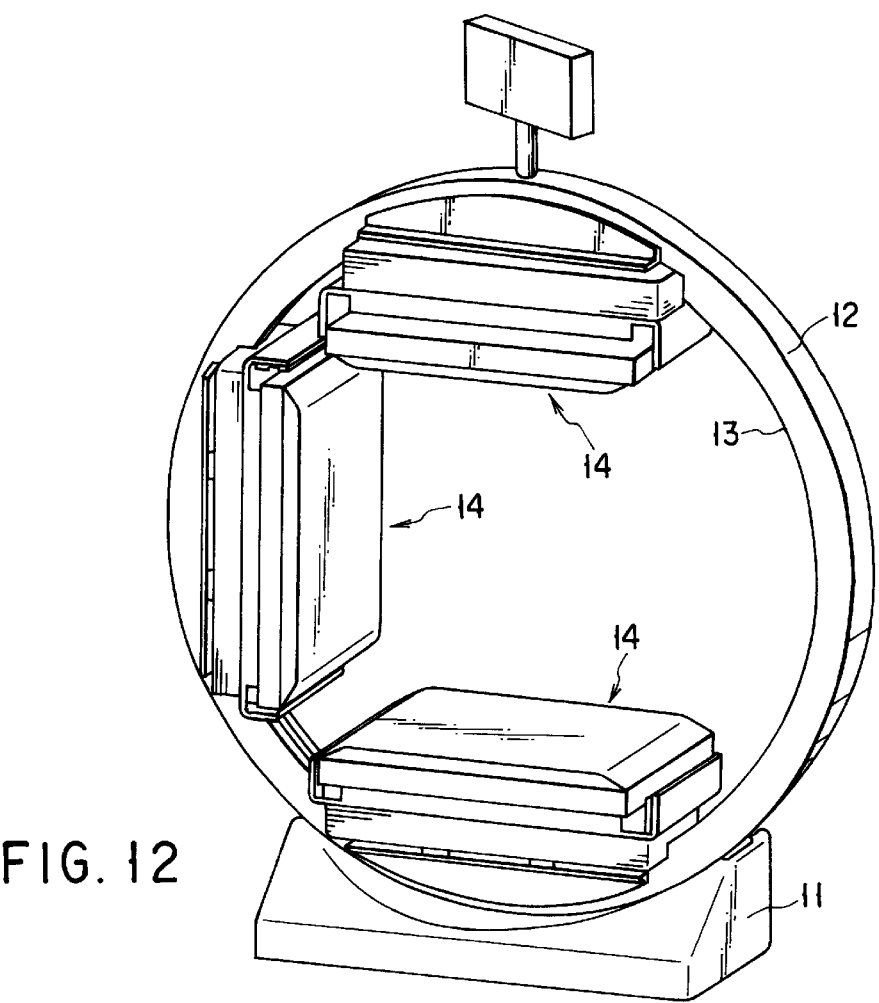
FIG. 12 is a perspective view of the nuclear medical diagnostic apparatus according to the first embodiment, which is set in the form of a three-detector type of C-shaped arrangement.

Further, since the attachments 41 to 46 are arranged as described above, the arrangement of the detectors 21 can be changed. For example, two detectors may take face-to-face opposition arrangement (FIG. 9) or 90°-interval arrangement (FIG. 11). In the case of a three-detector type, the detectors may take triangle, or 120°-interval arrangement (FIG. 10), and may be modified to C-shaped arrangement (FIG. 12), wherein three detectors are arranged at 90°-intervals. The apparatus can therefore selectively generate static images, SPECT image, and coincidence PET images.

The number of attachments used (41–46) and the arrangement thereof are not limited to the number and arrangements described above. The attachments may be provided at any other position on the rotating ring 13.

Figure 13:
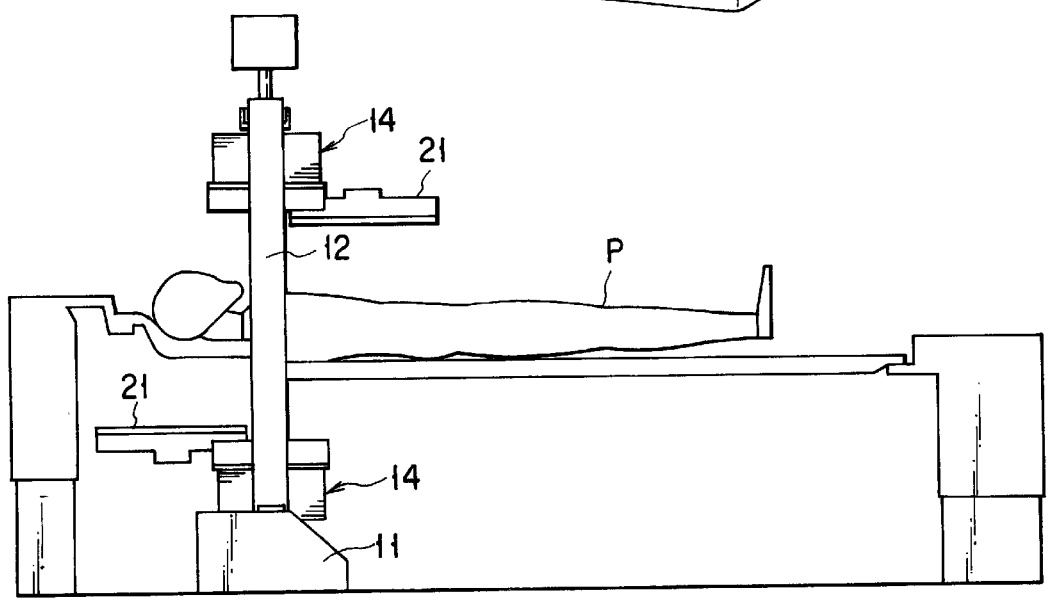
FIG. 13 is a perspective view showing the nuclear medical diagnostic apparatus according to the first embodiment, being used to form images of two parts at the same time.
Figure 14:
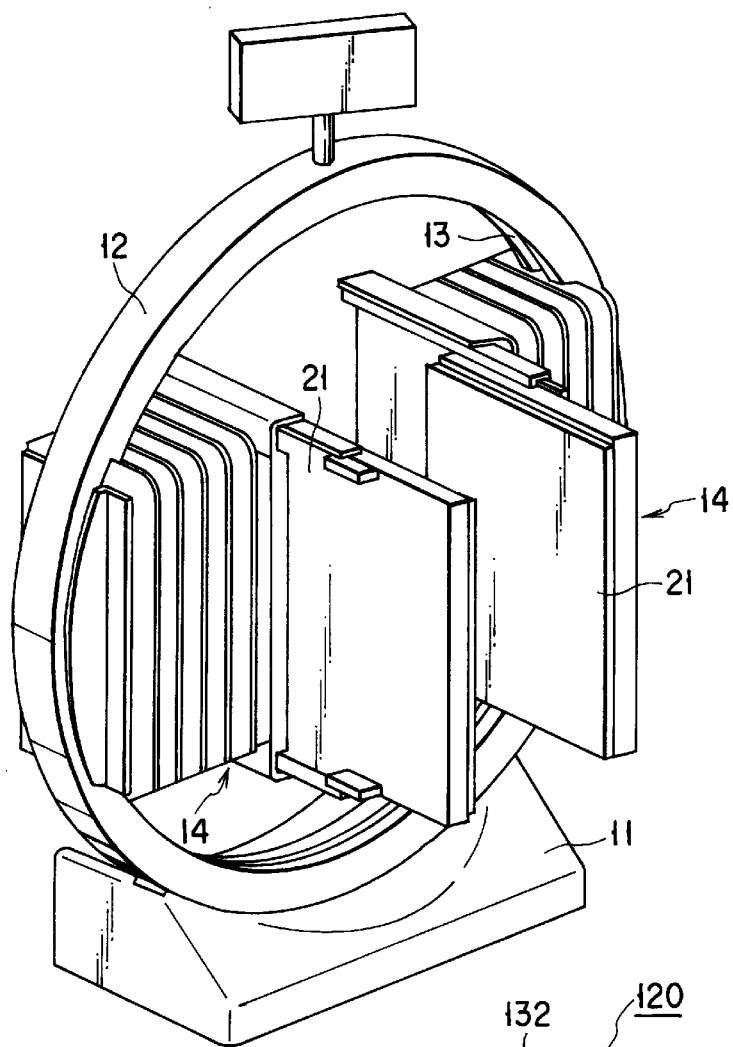
FIG. 14 is a perspective view showing the nuclear medical diagnostic apparatus according to the first embodiment, being used to form image by means of two detectors in face-to-face arrangement.

The rotation, sliding and tilting of the detector 21 increase the freedom of image generating mode. For instance, the detector 21 may be rotated 90° so that the long axis of the detector 21 may cover the width of the subject P. In the two-detector type, the detectors may be slid in different directions as shown in FIG. 13, so that images of two parts, e.g., the head and the heart, may be obtained at the same time. Alternatively, the two detectors may be slid, while opposing each other as shown in FIG. 14, to obtain image of a broad region from two directions.

In the three-detector type, the detectors may assume the C-shaped arrangement, whereby a SPECT data of the heart may be acquired by means of the two detectors positioned face to face, and a fan-beam SPECT data of the head may be simultaneously acquired by means of the other detector. Alternatively, the two detectors positioned face to face may acquire coincidence PET data (using no collimators), while the other detector acquires SPECT data. These are impossible to achieve with the conventional apparatuses. In the four-detector type, the detectors are, of course, arranged in a rectangle, to enhance the detection sensitivity further.

Figure 15:
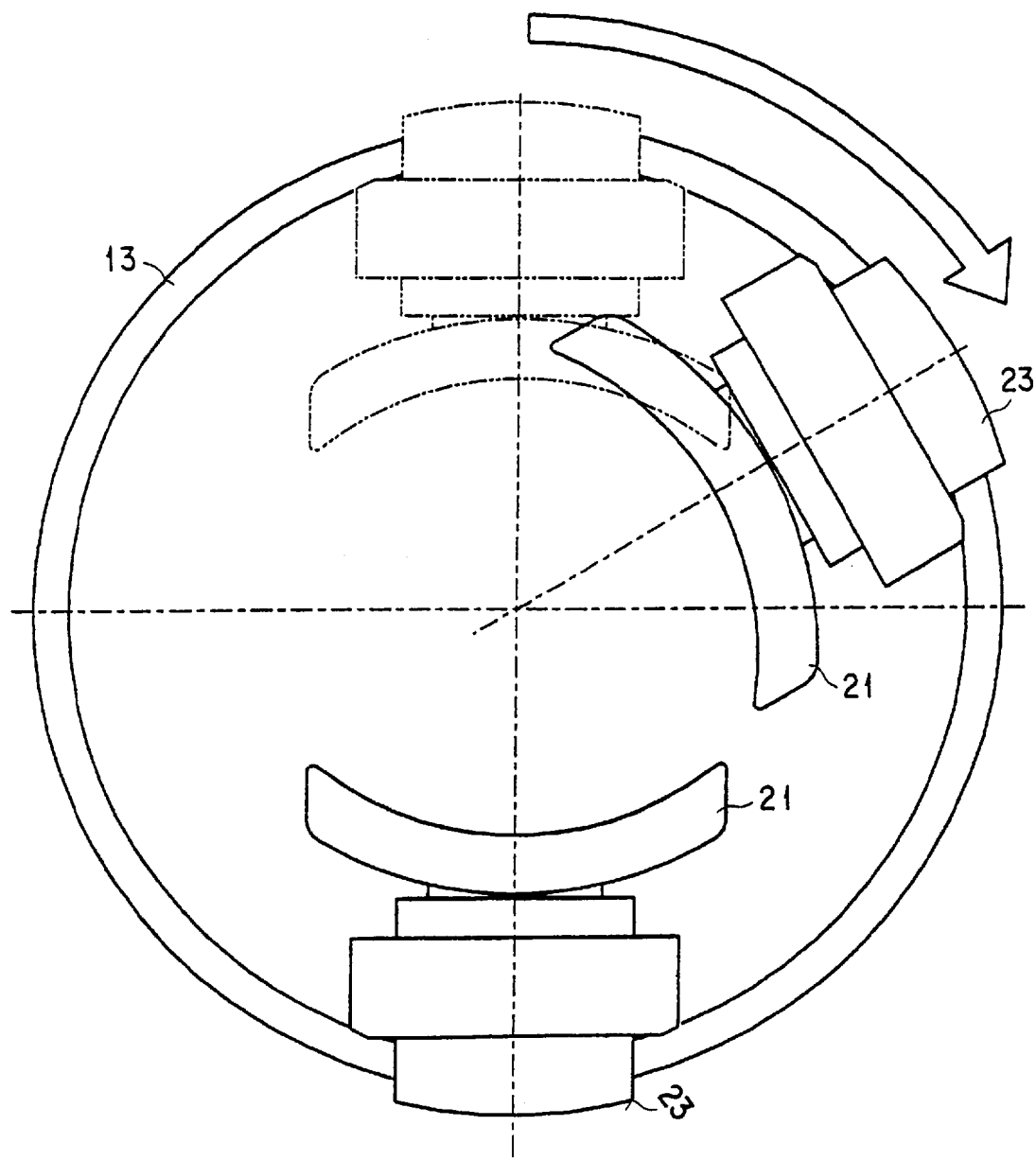
FIG. 15 is a diagram depicting the means for changing the arrangement of sensors in the first embodiment.
Figure 16:
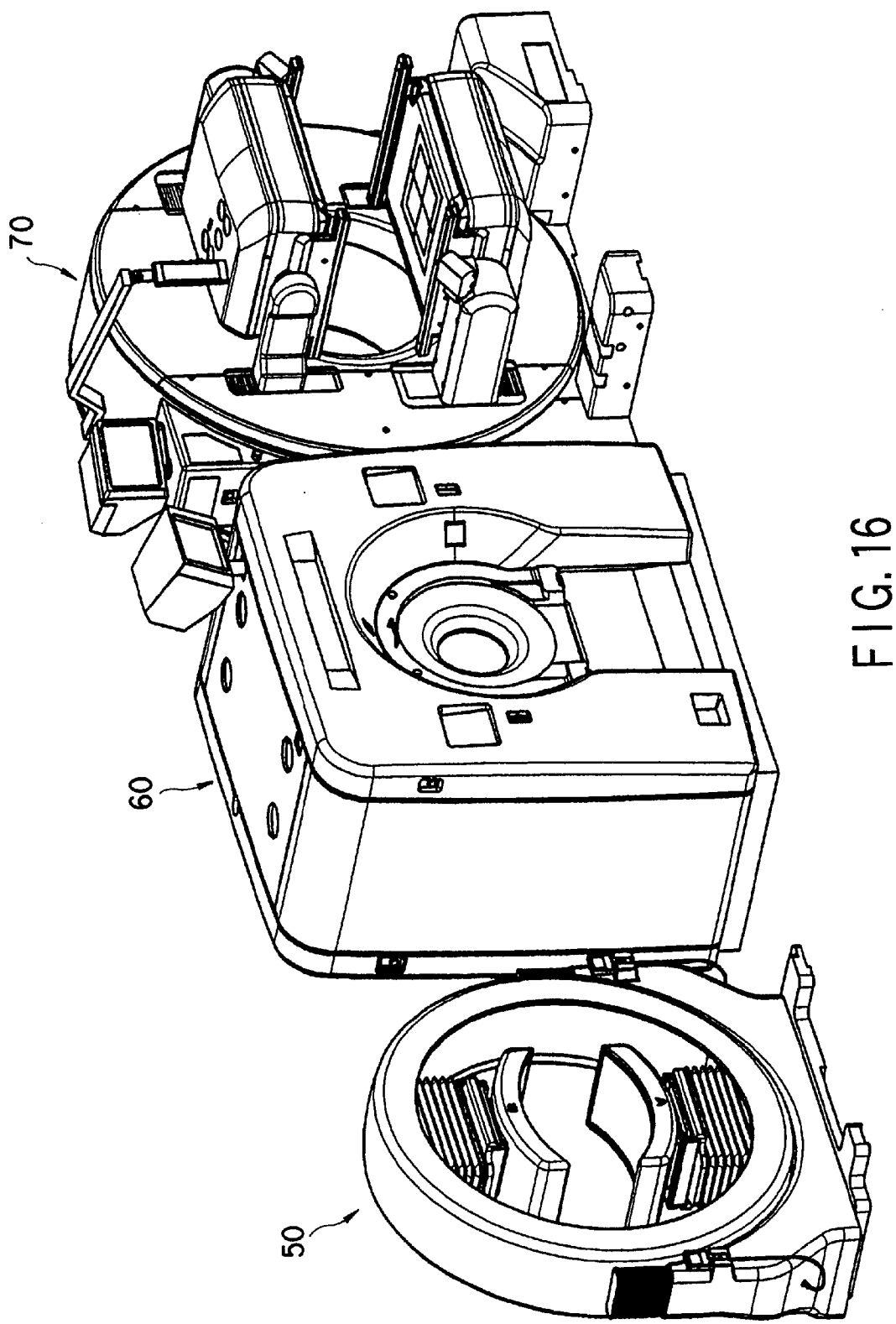
FIG. 16 shows the nuclear medical diagnostic apparatus and the first embodiment of the invention, for facilitating comparison of the two apparatuses.
Figure 19A:
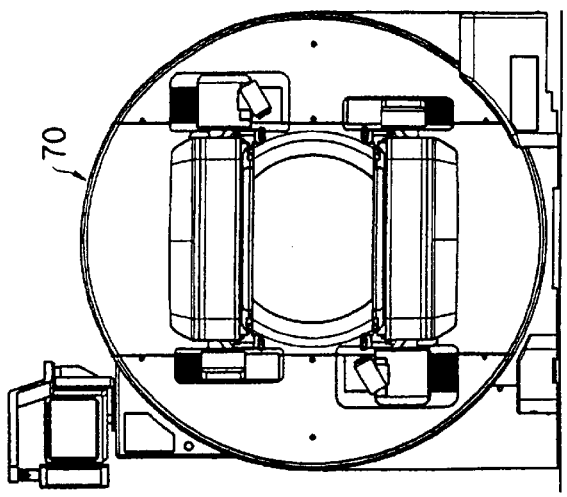
FIG. 19A is a front view of another conventional nuclear medical diagnostic apparatus.
Figure 19B:
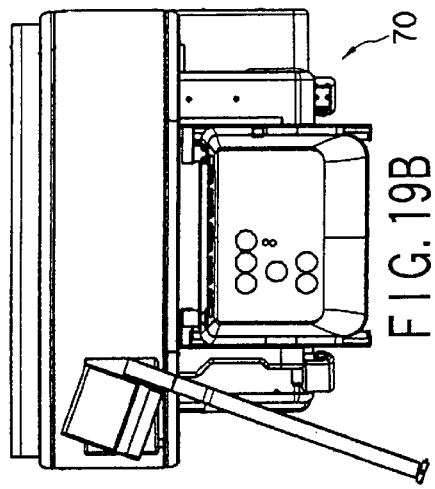
FIG. 19B is a top view of the other conventional nuclear medical diagnostic apparatus.
Figure 18A:
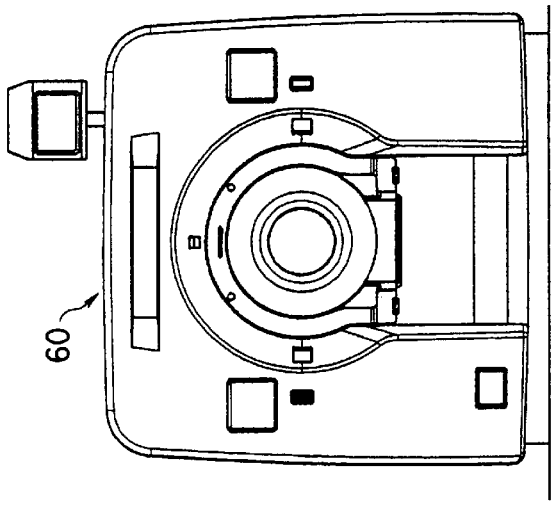
FIG. 18A is a front view of a conventional nuclear medical diagnostic apparatus.
Figure 18B:
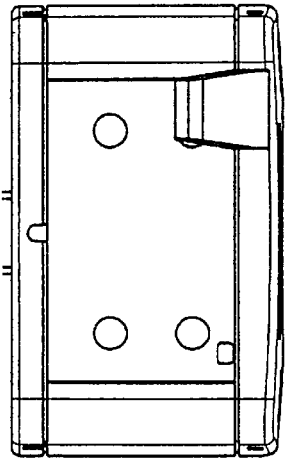
FIG. 18B is a top view of the conventional nuclear medical diagnostic apparatus.
Figure 17A:
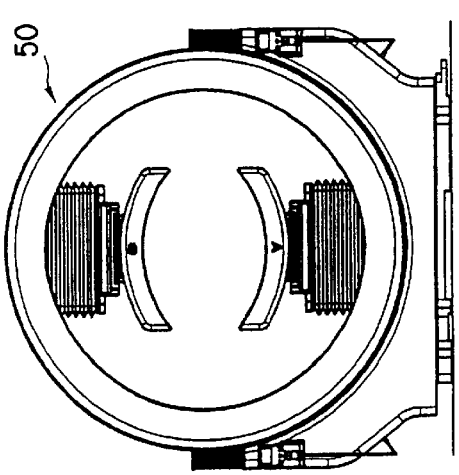
FIG. 17A is a front view of the nuclear medical diagnostic apparatus according to the first embodiment.
Figure 17B:
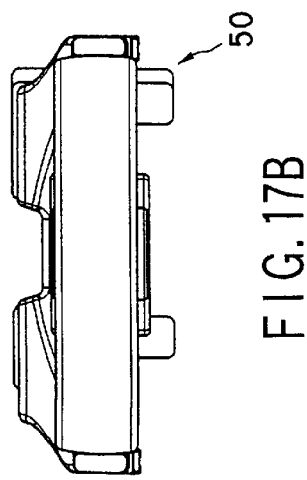
FIG. 17B is a top view of the nuclear medical diagnostic apparatus according to the first embodiment.

The detector unit 14 can slide with respect to the rotating ring 13. Therefore, the arrangement of two detectors, for example, can be changed from face-to-face arrangement to 90°-interval arrangement. More precisely, as shown in FIG. 15, one of the detectors 21 is unlocked, thus set free from the rotating ring 13, while the other detector 21 is held locked to the rotating ring 13. In this condition the free detector 21 moves under gravity to the lowest point on the rotating ring 13. When the rotating ring 13 is rotated 90°, the free detector 21 slides on the rotating ring 13 until it becomes spaced from the locked detector 21 at 90°-interval. When the free detector 21 is finally locked to the rotating ring 13, the arrangement is changed completely. Thus, the arrangement can be changed very easily.

Second Embodiment

Figure 21:
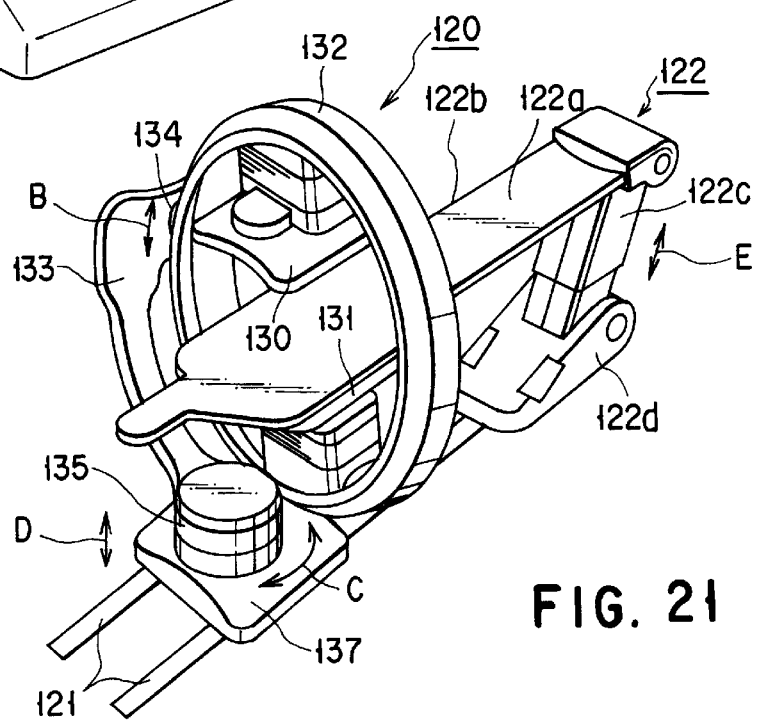
FIG. 21 is a perspective view of a nuclear medical diagnostic apparatus according to the second embodiment of the present invention.
Figure 22:
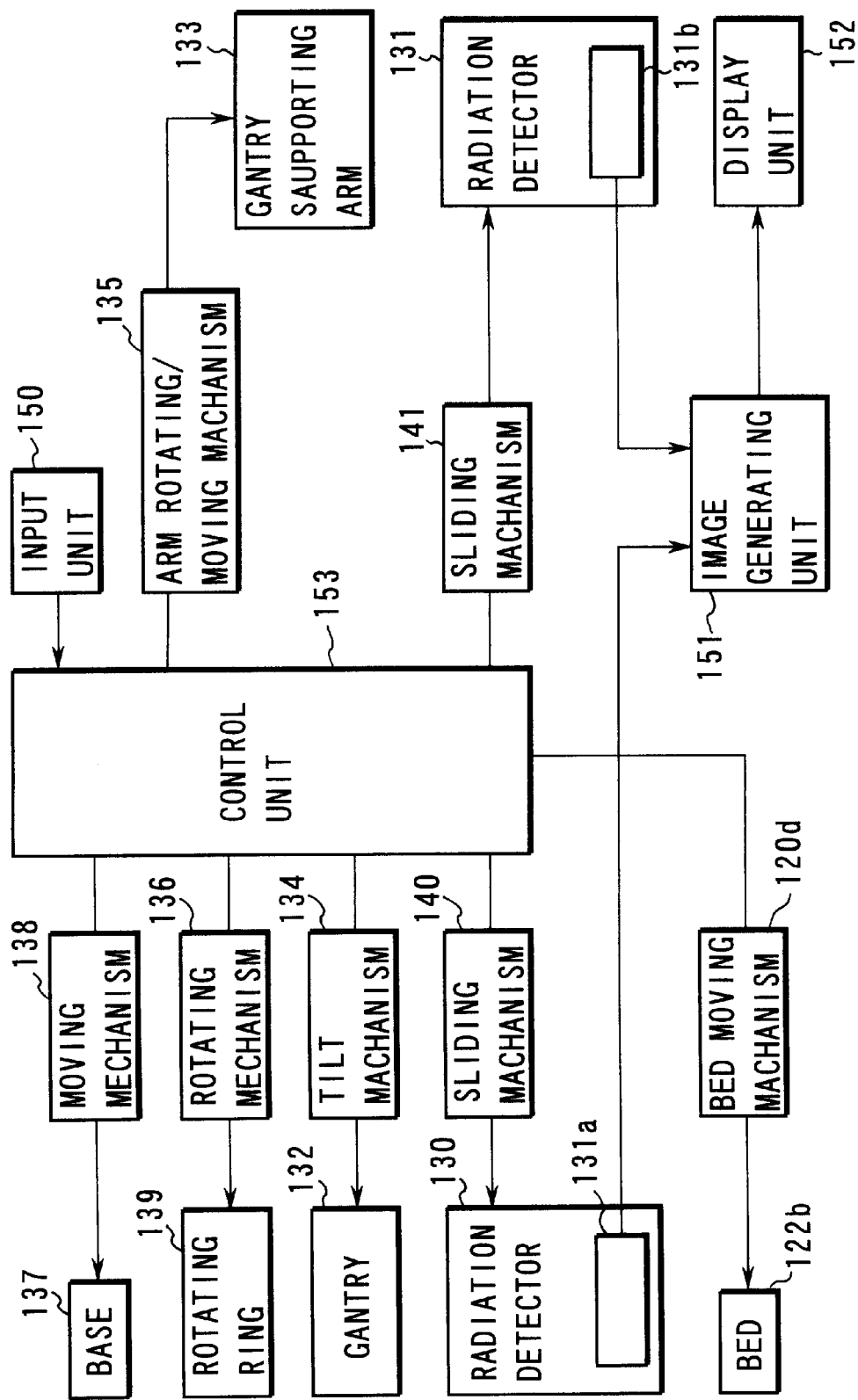
FIG. 22 is a block diagram showing the nuclear medical diagnostic apparatus according to the second embodiment.

FIG. 21 is a diagram showing the outer appearance of the radiation detecting system used in a nuclear medical diagnostic apparatus according to the second embodiment of the invention. FIG. 22 is a block diagram depicting the nuclear medical diagnostic apparatus incorporating the radiation detecting system.

As shown in FIGS. 21 and 22, the nuclear medical diagnostic apparatus incorporating the radiation detecting system according to the second embodiment comprises a gantry section 120, gantry rails 121, a bed section 122, an input unit 150, an image generating unit 151, a display unit 152, and a control unit 153. The gantry section 120 detects radiation, e.g., gamma rays, emanating from a subject such as a patient, to acquire various nuclear medical data item, i.e., SPECT data and PET data. The gantry section 120 is mounted on the rails 121 laid on the floor of an examination room or the like and can move along the axis of the patient. The patient may lie on the bed section 122. The input unit 150 comprises a keyboard and a mouse or the like, for inputting commands and data that are used to acquire nuclear medical data. The image generating unit 151 generates images from the nuclear medical data the gantry section 120 has acquired. The display section 152 comprises a cathode-ray tube (CRT) display, a liquid crystal display and the like and displays various images the image generating section 151 has generated. The control unit 153 controls the entire nuclear medical diagnostic apparatus.

The gantry section 120 comprises radiation detectors 130 and 131, a ring-shaped gantry 132, sliding mechanisms 140 and 141, a gantry supporting arm 133, a tilt mechanism 134, an arm swiveling/moving mechanism 135, a base section 137, a moving mechanism 138, a rotating ring 139, and a rotating mechanism 136. The radiation detectors 130 and 131 oppose each other, with the patient lying between them, for detecting the radiation emanating from the patient. The detectors 130 and 131 have a signal processing section 131$a$ and a signal processing section 131$b$, respectively, which process the electric signals generated from the radiation detected. The detectors 130 and 131 are secured to the inner circumferential surface of the ring-shaped gantry 132 by support arms (not shown). The sliding mechanisms 140 and 141 move the support arms and the like, to move the radiation detectors 130 and 131. The gantry supporting arm 133 is an overhang-type one supporting one side of the gantry 132. The tilt mechanism 134 can tilt the gantry 132 from the vertical position in a tilting direction (the direction of arrow B), through a maximum angle of ±90° or over a range of 180°. The gantry 132 is tilt by 0° while remaining perpendicular to the floor, or in the vertical position, and is tilted by 90° while remaining in the horizontal position. The arm swiveling/moving mechanism swivels the gantry supporting arm 133 by 90° (in the direction of arrow C) and moves the arm 133 vertically (in the direction of arrow D). The base section 137 is mounted on the rails 121 and can move, supporting the tilt mechanism 134, gantry supporting arm 133 and arm swiveling/moving mechanism 135, which in turn support the gantry 132. The moving mechanism 138 moves the base section 137. The rotating ring 139 is secured to a fixed ring (not shown) and can rotate around the patient. The rotating mechanism 136 is provided to rotate the rotating ring 139 around its axis (i.e., ring axis).

The bed section 122 comprises a bed 122$b$, a bed support 122$c$, and bed moving mechanism 120$d$. The bed 122$b$ has a top plate 122$a$ on which the patient may lie and which can be removed. The bed support 122$c$ supports the bed 122$b$. The bed moving mechanism 120$d$ moves the bed support 122$c$, thereby moving the bed 112$b$ vertically (in the direction of arrow E).

The radiation detectors 130 and 131 are not Auger-type ones that are used in the conventional nuclear medical diagnostic apparatuses. They are semiconductor detectors, each having an array of semiconductor cells which are made of semiconductor (e.g., cadmium zinc telluride (CdZnTe), cadmium telluride (CdTe), or the like). Alternatively, they may be scintillation detectors, each being a combination of a scintillator (sodium iodide (NaI), cesium iodide (CsI), or the like) and a photodiode. They are smaller and lighter than the conventional Auger-type radiation detectors. The gantry used in the nuclear medical diagnostic apparatuses according to the second embodiment can be lighter; its weight can be a third to a fourth of that of a gantry which has the conventional Auger-type radiation detectors. The gantry can therefore be rotated in its entirety, unlike the conventional one, by means of a mechanism (i.e., the tilt mechanism 134).

The radiation detectors 130 and 131 have a concave detection surface that opposes the patient. Instead, they may have a flat detection surface.

In the second embodiment of the invention, described above, the tilt mechanism 134 tilts the gantry 132 supported by the gantry supporting arm 133. The arm rotating/moving mechanism 135 holds, vertically moves and rotate the gantry supporting arm 133. Further, the base section 137 is moved on the rails 121, moving the whole gantry. The radiation detectors can thereby be arranged at positions where they can serve to provided SPECT images or still images of, for example, a prescribed part of the patient.

In the second embodiment of the invention, the gantry supporting arm constitutes a one-point support structure, supporting the gantry at one side only. The arm may be modified to support both sides of the gantry, thus constituting a two-point support structure which supports the gantry more reliably. A radiation detecting system of two-point support structure, in which a gantry is supported at both sides, will be described.

Figure 23:
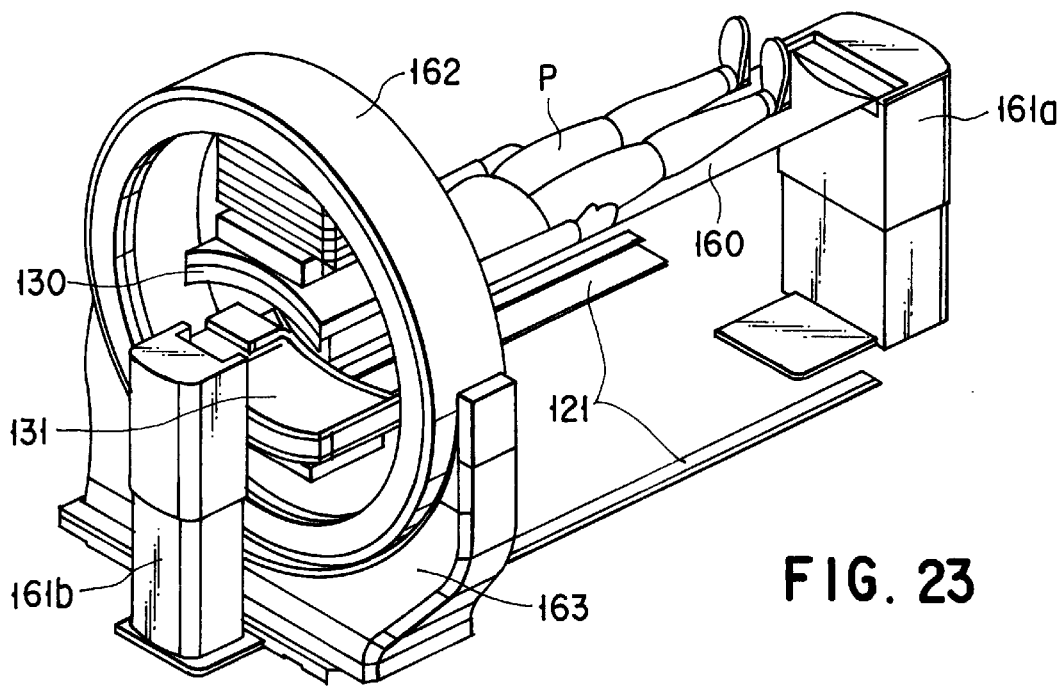
FIG. 23 is a diagram showing the outer appearance of the nuclear medical diagnostic apparatus according to the second embodiment, in which the gantry is supported at both sides, and also showing the component arrangement of the apparatus.
Figure 24:
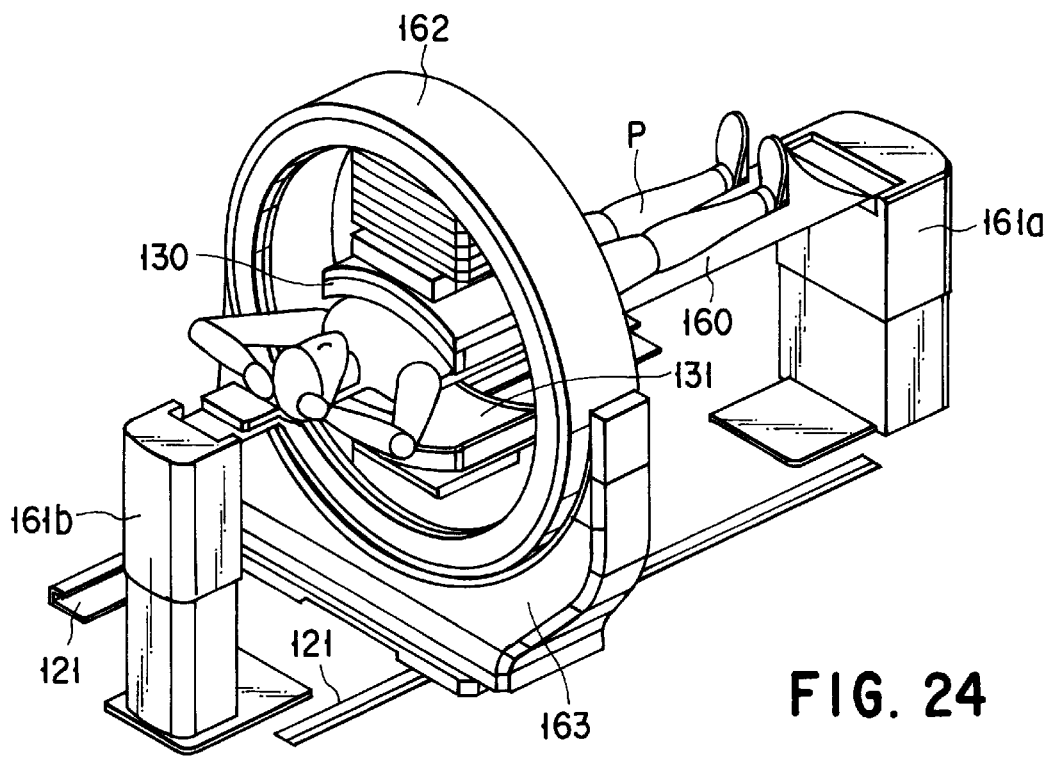
FIG. 24 is another diagram showing the outer appearance of the depicting the nuclear medical diagnostic apparatus according to the second embodiment, in which the gantry is supported at both sides, and depicting the component arrangement of the apparatus.
Figure 25:
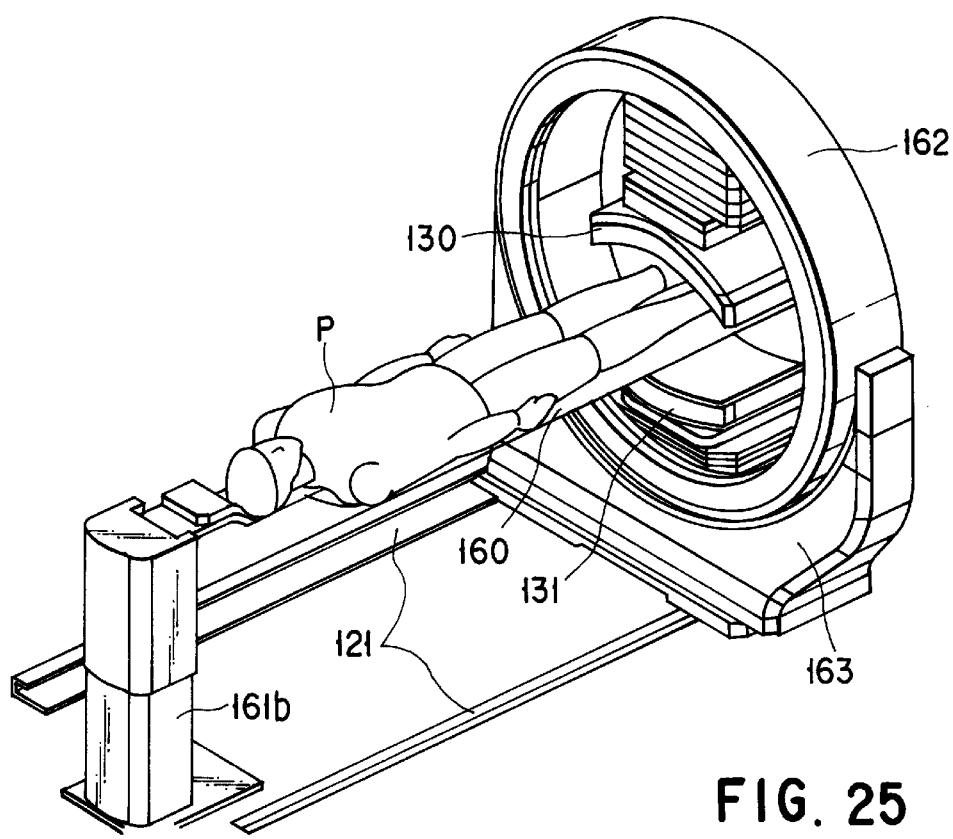
FIG. 25 is still another diagram showing the outer appearance of the nuclear medical diagnostic apparatus according to the second embodiment, in which the gantry is supported at both sides, and also showing the component arrangement of the apparatus.

FIGS. 23 to 25 show an outer appearance and component arrangement of a radiation detecting system in which the gantry of the second embodiment of the invention is supported at both sides. FIG. 23 is a diagram showing the components located at specific positions to provide SPECT images of the head of a patient P. FIG. 24 is a diagram showing the components located at specific positions to provide SPECT images of the heart of the patient P. FIG. 25 is a diagram showing the components located at specific positions to provide SPECT images of the legs of the patient P.

The radiation detecting system shown in FIGS. 23 to 25, in which the gantry of the second embodiment of the invention is supported at both sides, is similar in structure and function to the radiation detecting system shown in FIG. 22 and described above, except for the gantry supporting arm, the base section, and the like. The system comprises a bed 160, bed moving mechanisms 161a and 161b, a ring-shaped gantry 162, radiation detectors 130 and 131, and a base section 163. The bed 160 has a top plate on which a patient P may lie. The moving mechanisms 161a and 161b support the bed 160 and can move the bed 160 in vertical direction. The radiation detectors 130 and 131 are movably provided on the inner circumferential surface of the gantry 162. The detectors 130 and 131 oppose each other, with the patient P lying between them. The base section 163 supports the gantry 162 and can be tilt.

As shown in FIGS. 23 and 25, the patient P climbs onto the top plate 160 and lies thereon. The base section 163 is moved on the rails 121 to a position where nuclear medical data about the head, heart or legs of the patient P can be acquired. Thereafter, the radiation detectors 130 and 131 provided on the gantry 162 are set close to the patient P. The detectors 130 and 131 acquire nuclear medical data. To obtain a tomogram, the system is controlled, thereby rotating the radiation detectors 130 and 131 rotated around the patient P.

In order to acquire nuclear medical data from all parts of the patient P, the radiation detectors 130 and 131 detect radiation emanating from the patient P, while the base section 163 is moving on the rails 121.

If necessary, the gantry 162 is tilt by a prescribed angle by means of a tilt mechanism (not shown), whereby the nuclear medical data is acquired.

Thus, the radiation detectors can be arranged near various parts of the patient. This makes it possible to enhance the spatial resolution or sensitivity of the detectors.

Figure 26:
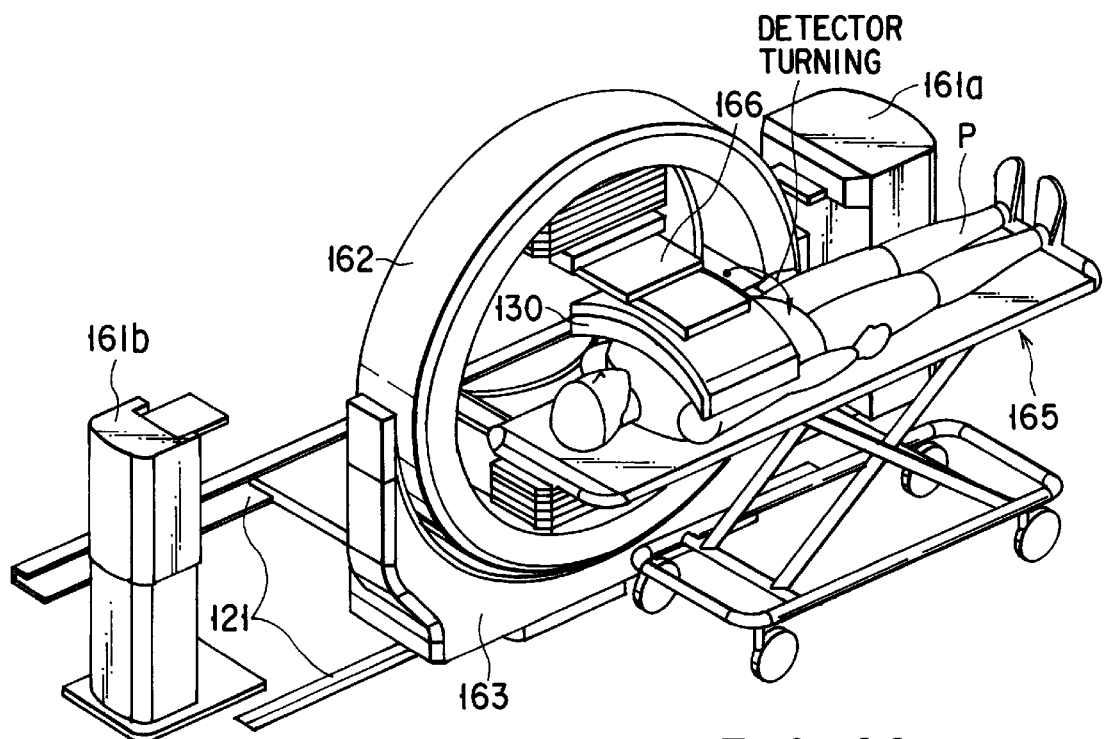
FIG. 26 is a diagram showing an alternative arrangement of components in the nuclear medical diagnostic apparatus according to the second embodiment, in which the gantry is supported at both sides.

FIG. 26 is a diagram showing an alternative arrangement of components in the radiation detecting system, wherein the gantry according to the second embodiment of the invention is supported at both sides. As shown in FIG. 26, the bed 160 is removed, and a height-adjustable stretcher 165, which is used as a bed supporting and carrying a patient P, is positioned beside the gantry 162. Next, the base section 163 on the rails 121 is swiveled 90° C. to face the stretcher 165 on which the patient P is lying. The base section 163 is moved toward the stretcher 165. The moving mechanism 166 slides the radiation detector 130 fastened to the gantry 162, toward the front of the patient P along the rotation axis of the gantry 162. Then, the detector 130 is turned 90°, approaching the patient P, and starts acquiring nuclear medical data. Although not shown in FIG. 26, the moving mechanism slides the radiation detector 131, too, toward the back of the patient P along the rotation axis of the gantry 162. In a position near the patient P, the radiation detector 131 acquires nuclear medical data.

Thus, the nuclear medical data can be acquired without transferring the patient P from the stretcher 165 to the bed 160. The discomfort posed on the patient P can therefore be reduced. In addition, the radiation detectors can acquire nuclear medical data which is reliable, because the detectors can approach the patient P and, hence, can have high spatial resolution or detection sensitivity.

The gantry 162 may be moved on the rails 121, with the radiation detectors 130 and 131 located near the patient P lying on the stretcher 165 (or on the bed). In this case, the detectors can acquire nuclear medical data from the whole body of the patient P.

Third Embodiment

Figure 27:
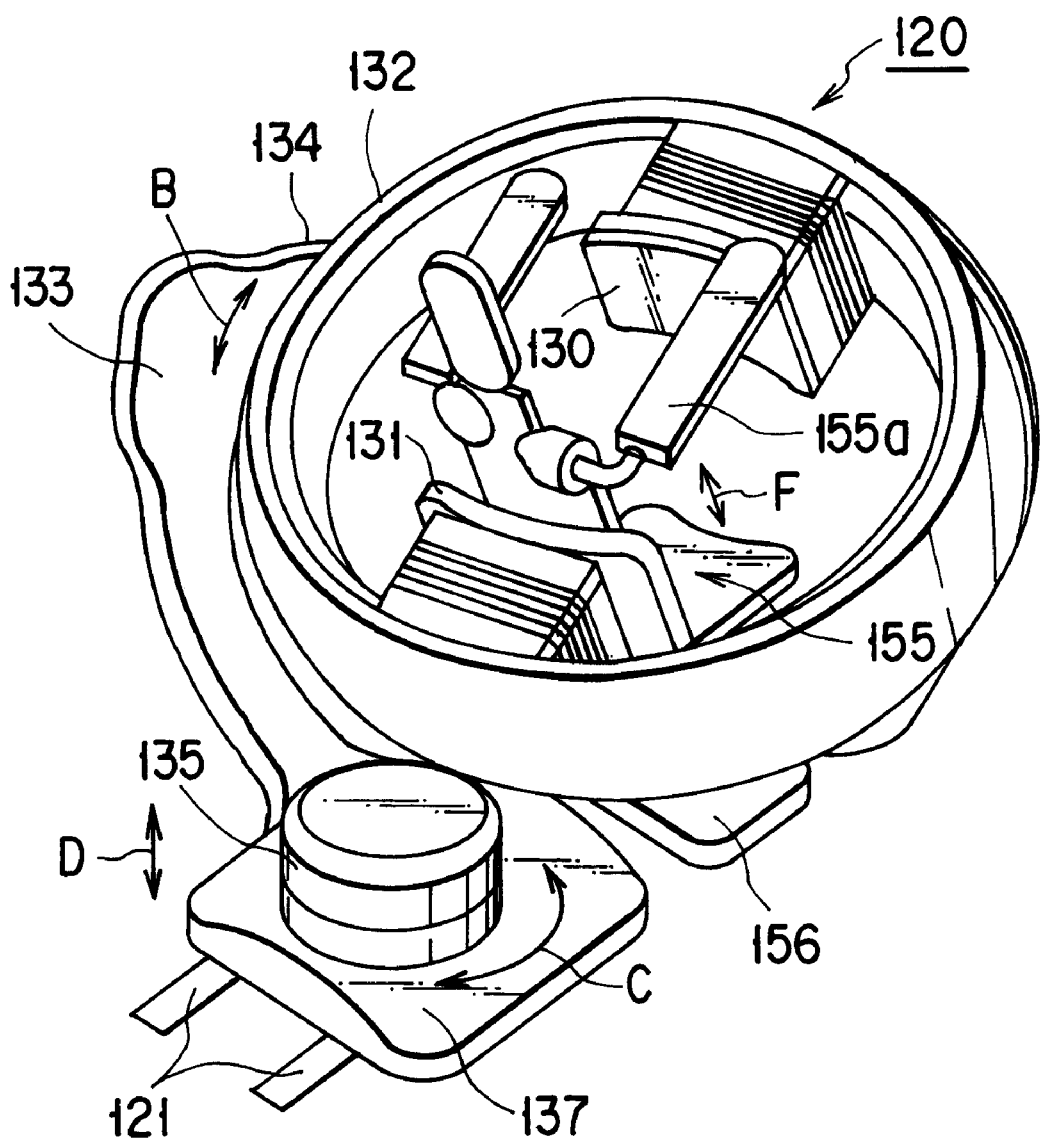
FIG. 27 is a diagram depicting the outer appearance of a nuclear medical diagnostic apparatus according to the third embodiment of the present invention.
Figure 28:
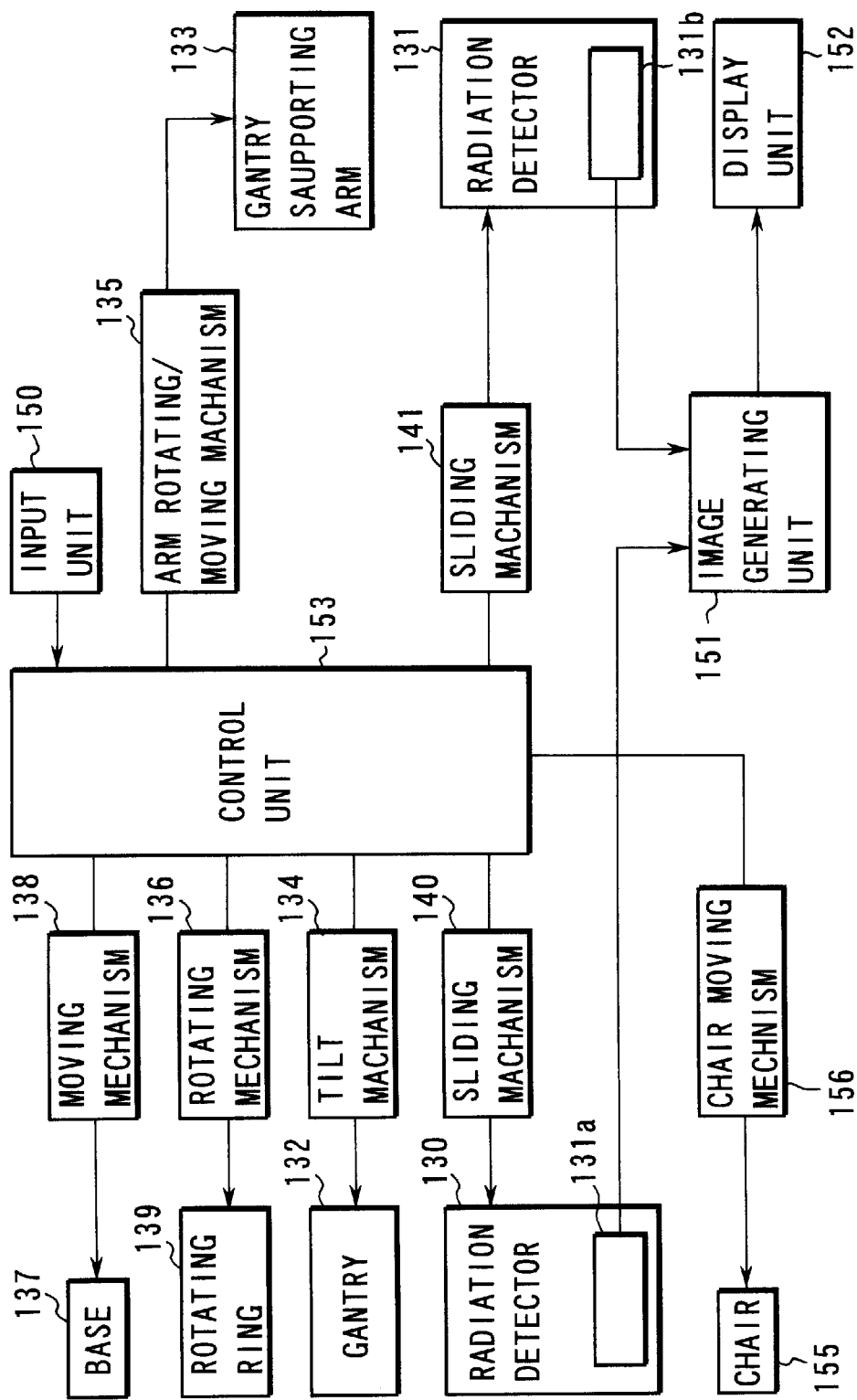
FIG. 28 is a block diagram of the nuclear medical diagnostic apparatus according to the third embodiment.

FIG. 27 is a diagram depicting the outer appearance of the radiation detecting system provided in the nuclear medical diagnostic apparatus according to the third embodiment of the invention. FIG. 28 is a block diagram of the nuclear medical diagnostic apparatus, which incorporates the radiation detecting system according to the third embodiment. FIG. 27 shows the gantry tilt by a predetermined tilt angle.

As shown in FIGS. 27 and 28, the third embodiment of the present invention is similar in basic structure to the nuclear medical diagnostic apparatus that comprises the radiation detecting system according to the second embodiment. However, it has a chair 155 and a chair moving mechanism 156, in place of the bed on which a patient may lie. The patient sits on the chair 155 so that nuclear medical data, such as SPECT data about the head or heart of the patient may be acquired. The chair moving mechanism 156 is designed to move the chair 155 up or down (in the direction of arrow F).

The chair 155 has removable arm rests 155a. The patient can place his or her arms on the rests 155a to take a comfortable position. If placed on the rests 155a, the arms would not hinder the acquisition of nuclear medical data from, for example, the heart of the patient. Thus, the images obtained are prevented from deteriorating in their quality.

In the third embodiment of the invention, the gantry supporting arm constitutes a one-point support structure, supporting the gantry at one side only. The gantry may be modified into a two-point support structure which supports the gantry at both sides. A radiation detecting system of two-point support structure, in which a gantry is supported at both sides, will be described.

Figure 29:
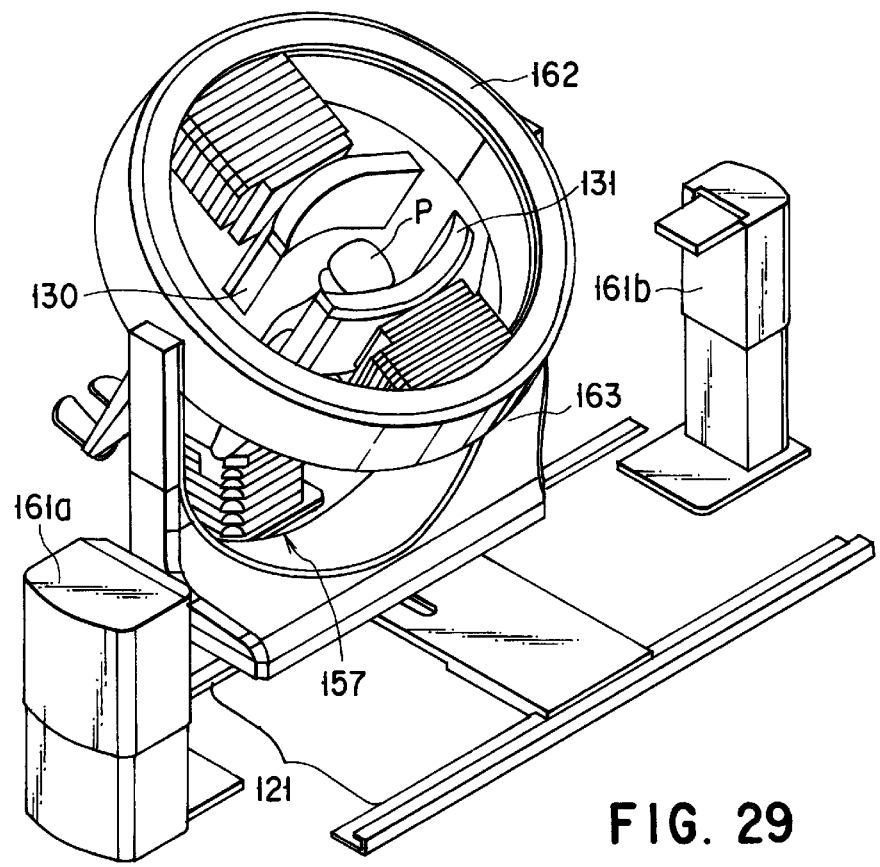
FIG. 29 is a diagram showing the outer appearance of the nuclear medical diagnostic apparatus according to the third embodiment, in which the gantry is supported at both sides, and also showing the component arrangement of the apparatus.
Figure 30:
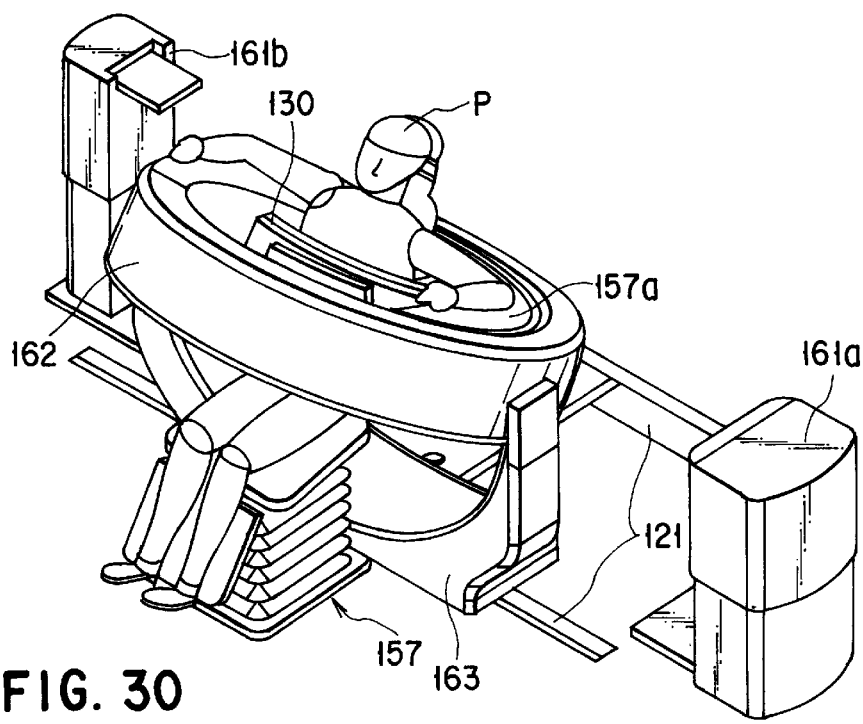
FIG. 30 is another diagram showing the outer appearance of the nuclear medical diagnostic apparatus according to the third embodiment, in which the gantry is supported at both sides, and also showing the component arrangement of the apparatus.

FIGS. 29 to 30 show an outer appearance and component arrangement of the radiation detecting system used in the nuclear medical diagnostic apparatus according to the third embodiment, in which the gantry is supported at both sides. FIG. 29 is a diagram showing the components located at specific positions to acquire nuclear medical data about the head of a patient P. FIG. 30 is a diagram showing the components located at specific positions to acquire nuclear medical data about the heart of the patient P.

The radiation detecting system shown in FIGS. 29 and 30, in which the gantry of the third embodiment of the invention is supported at both sides, is similar in structure and function to the radiation detecting system shown in FIG. 28 and described above, except for the gantry supporting arm, the base section, and the like. The system comprises a chair 157, a ring-shaped gantry 162, radiation detectors 130 and 131, and a base section 163. The chair 157, on which the patient P may sit, has arm rests 157a. The radiation detectors 130 and 131 are movably provided on the inner circumferential surface of the gantry 162. The detectors 130 and 131 oppose each other, with the patient P lying between them. The base section 163 supports the gantry 162 and can be tilt.

As shown in FIGS. 29 and 30, the base section 163 on the rails 121 is rotated 90° and oriented in a different direction. The patient P sits on the chair 157, and the chair 157 is adjusted in its height. The gantry 162 is moved up or down and tilted by a predetermined tilt angle. Further, the radiation detectors 130 and 131 are set close to the patient P to acquire nuclear medical data about the head or heart of the patient P. In order to acquire nuclear medical data about the heart of the patient P, the arm rests 157a are attached to the chair 157, and the arms of the patient P are held on the arm rests 157a.

To obtain a tomogram of the head or heart of the patient, the system is controlled, thereby rotating the radiation detectors 130 and 131 rotated around the patient P.

Thus, the patient P can take a comfortable position and relaxed, feeling no pressure, as the radiation sensors approach him or her, while SPECT data or the like about the head or heart is being acquired. Since the patient feel no stress while a tomogram of the head is being formed, a stimulus test can be performed in natural manner to check the function of the head.

In the second embodiment, the above-mentioned chair may be attached to the system, merely by removing the top plate. Therefore, SPECT data or the like can be easily acquired from a patient who can hardly be transferred to the top plate.

If the patient is seated in the above-mentioned chair while SPECT data is being acquired, his or her liver will remain at a low position due to gravity, overlapping the heart only a little. The resultant images of the heart can therefore be prevented from deteriorating in their quality. In addition, the back of the chair may be rendered thinner to reduce the mechanical strength of the chair. The back of the chair may be wrapped with cloth having coating of a small radiation absorption coefficient. If so, the back will absorb little radiation, and acquisition of SPECT data about the heart can be accomplished to minimize deterioration of the image of the heart.

Thus, the images obtained are prevented from deteriorating in their quality.

With the conventional method of acquiring SPECT data about the heart, it is difficult to conduct a loading test on the heart. The above-mentioned chair may be used in combination of, for example, an ergometer. This makes it possible to perform acquisition of SPECT data about the heart, along with a loading test on the heart. Furthermore, SPECT data can be acquired from a region, from the lungs to the liver, by the use of two radiation detectors, while the patient remain seated in the chair.

Needless to say, SPECT data or the like can be acquired by using an ordinary chair in place of the chair described above, though from a limited region only. The above-mentioned chair may be improved in movability. In this case, the patient seated in the chair can be transferred from the bedroom to the examination room, in which acquisition of SPECT data can be performed without transferring the patient.

The back of the above-mentioned chair may have openings. If so, the breasts of a female patient will rest in the openings when she sits backward on the chair. While the patient stays in this position on the chair, the gantry may be tilt by an tilt angle of nearly 90°, facilitating acquisition of mammo SPECT data or mammo PET data.

Fourth Embodiment

Figure 31:
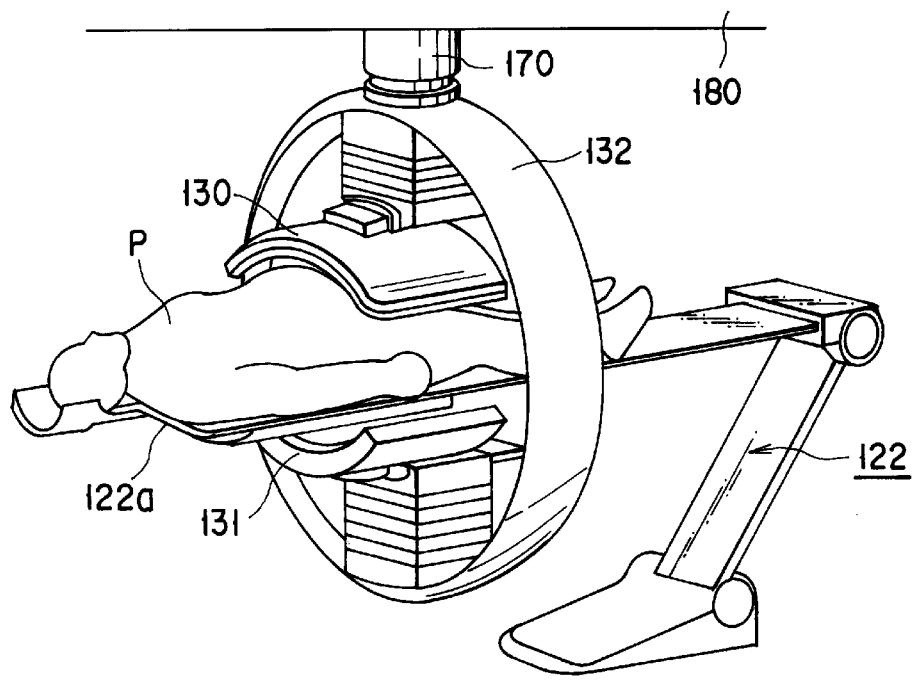
FIG. 31 is a diagram showing the outer appearance of a nuclear medical diagnostic apparatus according to the fourth embodiment, in which the gantry is provided on the ceiling, and depicting the component arrangement of the apparatus.

FIG. 31 is a diagram showing the outer appearance of the radiation detecting system which is used in a nuclear medical diagnostic apparatus according to the fourth embodiment and in which the gantry is provided on the ceiling, and depicting the component arrangement of the system. The radiation detecting system of the fourth embodiment is similar in basic structure to the radiation detecting system of the second embodiment. It is different in that the gantry 132 is secured to a support section 170 that is provided on the ceiling 180 of a room such as an examination room.

As shown in FIG. 31, the support section 170 moves on the rails (not shown), moving the gantry 132 to a prescribed part of the patient P lying on the top plate 122a of the bed section 122. If necessary, the gantry 132 is tilted by means of a tilt mechanism (not shown). Thereafter, the radiation detectors 130 and 131 are set close to the patient P to acquire nuclear medical data.

Figure 32:
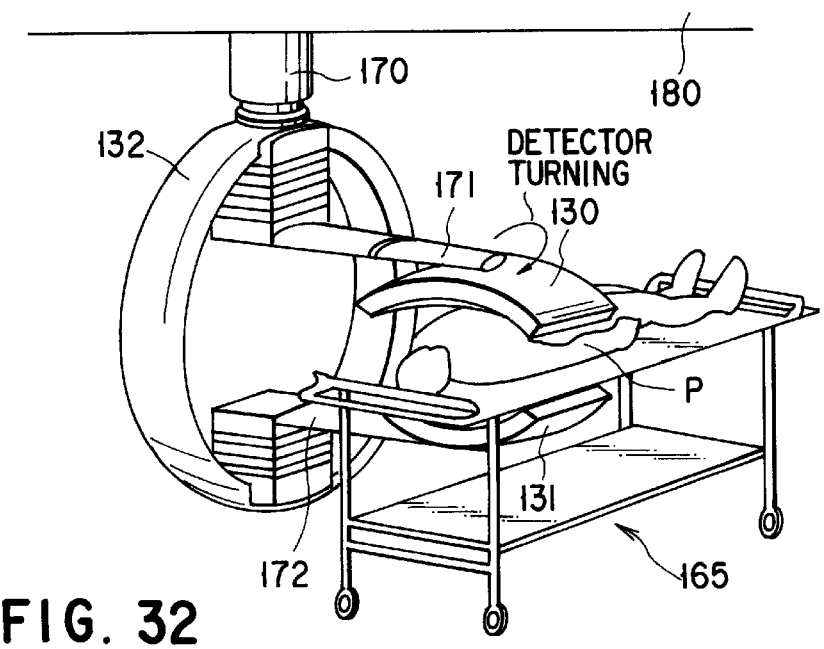
FIG. 32 is another diagram showing the outer appearance of a nuclear medical diagnostic apparatus according to the fourth embodiment, in which the gantry is provided on the ceiling, and depicting the component arrangement of the apparatus.

FIG. 32 is another diagram showing the radiation detecting system used in the nuclear medical diagnostic apparatus according to the fourth embodiment, in which the gantry is provided on the ceiling, and depicting the component arrangement of the system. As shown in FIG. 32, the patient P does not lie on the bed section 122. Rather, a stretcher 165, on which the patient P is lying, is moved to the gantry 132. The radiation detectors 130 and 131 attached to the gantry 132 are slid to the front and back of the patient, respectively, by means of moving mechanisms 171 and 172. Thereafter, the radiation detectors 130 and 131 are set adjacent to the patient P to acquire nuclear medical data.

As shown in FIG. 32, the moving mechanisms 171 and 172 slide the detectors 130 and 131 away from the rotating ring 132 and the detectors 130 and 131 are turned about 90°, while the patient P is lying on the stretcher 165 (or on the bed). The detectors 130 and 131 are thereby set close to the patient P. Then, the gantry 162 is moved on the rails 121, whereby data is acquired from the whole body of the patient P.

Thanks to the operation described above, various kinds of nuclear medical data can be easily acquired also in the case where the gantry is provided on the ceiling.

Fifth Embodiment

Figure 33:
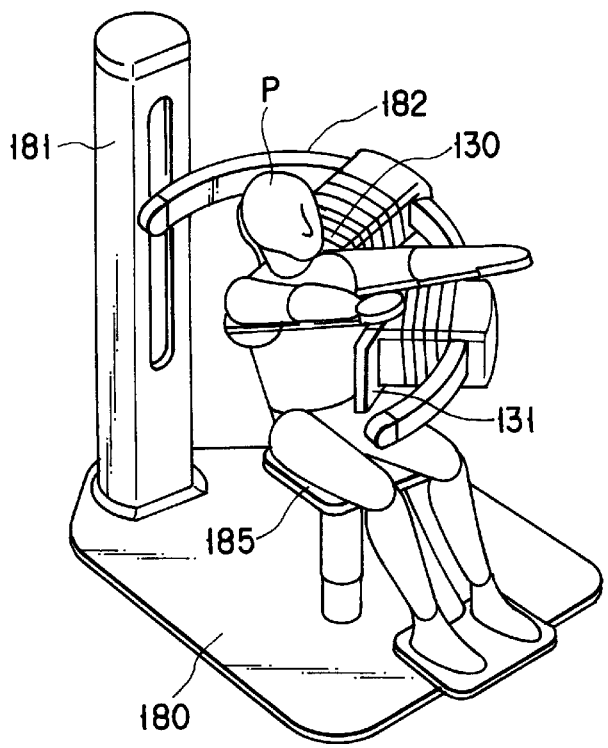
FIG. 33 is a diagram showing the outer appearance of a nuclear medical diagnostic apparatus according to the fifth embodiment and depicting the component arrangement of the apparatus.

FIG. 33 is a diagram showing the radiation detecting system which is used in a nuclear medical diagnostic apparatus according to the fifth embodiment, and depicting the component arrangement of the system. The radiation detecting system of the fifth embodiment comprises a base section 180, a support post 181, a C-shaped arm 182, two radiation detectors 130 and 131, and a chair 185. The post 181 stands on the base section 180. The arm 182 is secured to the support post 181 and can move up and down. The radiation detectors 130 and 131 are mounted on the C-shaped arm 182. The chair 185 is of special design, on which a patient may sit. The radiation detector 130 and 131 can be moved along the C-shaped arm 182. The C-shaped arm 182 can be tilted by means of a tilt mechanism (not shown).

In the radiation detecting system shown in FIG. 33, the chair 185 is adjusted in height, while the patient P remain sitting on the chair 185, and the C-shaped arm 182 is moved up or down. After the arms of the patient P have been held on arm rests, the radiation detectors 130 and 131 are set close to, for example, the heart of the patient P. Thus, with a simple structure it is possible to acquire nuclear medical data about the heart of the patient P.

Sixth Embodiment

Figure 34:
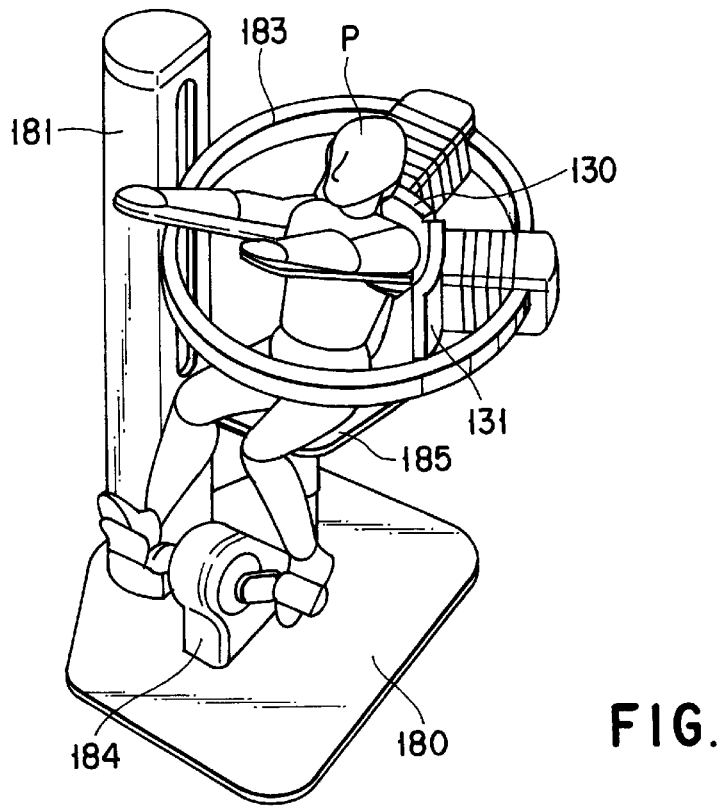
FIG. 34 is a diagram showing the outer appearance of a nuclear medical diagnostic apparatus according to the sixth embodiment and depicting the component arrangement of the apparatus.

FIG. 34 is a diagram showing the outer appearance of the radiation detecting system of the sixth embodiment and depicting the component arrangement of the system. The radiation detecting system of the sixth embodiment is similar in structure to the radiation detecting system of the fifth embodiment. It is different in that the radiation detectors 130 and 131 are secured to a ring 183, not to a C-shaped arm, by means of a tilt mechanism (not shown). The ring 183 can be tilted. Further, an ergometer 184 is provided so that a loading test may be performed on the heart of a patient P.

In the radiation detecting system shown in FIG. 34, the chair 185 is adjusted in height, while the patient P remains sitting on the chair 185, and the ring 183 is moved up or down. After the arms of the patient P have been held on arm rests, the radiation detectors 130 and 131 are set close to, for example, the heart of the patient P. Then, the ergometer 184 is used, performing a loading test on the heart, and the nuclear medical data about the heart of the patient P is acquired the same time. Thus, the acquisition of nuclear medical data can be easily accomplished during the loading test.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nuclear medical diagnostic apparatus comprising:
   at least one detector for detecting gamma rays emitted from radioisotope administered to a subject;
   a processor for generating a distribution of the radioisotope in the subject, on the basis of output of the detector;
   a rotating ring for supporting the detector,
   wherein the detector is mounted on the rotating ring, at an inner side in a radial direction of the rotating ring, and has a center of gravity located at an inner side on a rotation axis of the rotating ring, and
   wherein the detector is movable with respect to the rotating ring; and
   at least one sliding base, said detector being mounted on the rotating ring by way of the sliding base, and said sliding base being selectively held in a free rotating state or a locked state with respect to the rotating ring.

2. An apparatus according to claim 1, wherein the sliding base moves with respect to the rotating ring when the rotating ring rotates while the sliding base remains in the free rotating state.

3. An apparatus according to claim 1, further comprising a plurality of lock structures provided on the rotating ring and spaced apart from one another, said sliding base being locked at any desired one of the lock structures.

4. An apparatus according to claim 1, further comprising at least one attachment provided on the rotating ring, securing the detector detachably to the rotating ring.

5. An apparatus according to claim 1, wherein the detector is either a semiconductor type which coverts the gamma rays directly to electric signals or a composite type which comprises a scintillator and a photodiode and which converts the gamma rays indirectly to electric signals.

6. A nuclear medical diagnostic apparatus comprising:
   at least one radiation detector for detecting radiation emitted from radio isotope administered to a subject;
   a gantry for supporting the radiation detector;
   a swiveling mechanism for swiveling the gantry; and
   a tilt mechanism for tilting the gantry.

7. An apparatus according to claim 6, further comprising a bed on which the subject lies.

8. An apparatus according to claim 7, further comprising a mechanism for moving the bed up and down.

9. An apparatus according to claim 6, further comprising a chair on which the subject sits.

10. An apparatus according to claim 9, further comprising a mechanism for moving the chair up and down.

11. An apparatus according to claim 6, further comprising a mechanism for moving the gantry up and down.

12. An apparatus according to claim 6, wherein a range of angle, by which the tilt mechanism tilts the gantry, is 180°.

13. An apparatus according to claim 6, wherein the radiation detector has a plurality of semiconductor cells made of cadmium telluride or cadmium zinc telluride.

14. An apparatus according to claim 6, wherein the radiation detector comprises a bloc of cesium iodide and a plurality of phododiodes.

15. An apparatus according to claim 6, wherein the radiation detector is a scintillation detector.

16. An apparatus according to claim 6, wherein the gantry is movable along rails.

17. An apparatus according to claim 16, wherein the rails are laid on a floor.

18. An apparatus according to claim 16, wherein the rails are provided on a ceiling.

19. An apparatus according to claim 6, wherein the gantry is movable along an axis of the subject.

20. An apparatus according to claim 6, further comprising a support mechanism supporting the gantry at its one side or both sides.

21. An apparatus according to claim 6, wherein the gantry is capable of being oriented to a predetermined direction.

22. A nuclear medical diagnostic apparatus comprising:
   at least one radiation detector for detecting radiation emitted from radio isotope administered to a subject;
   a rotating ring for supporting the radiation detector;
   a swiveling mechanism for swiveling the rotating ring; and a moving mechanism for moving the radiation detector along an axis of the rotating ring.

23. An apparatus according to claim 22, wherein the swiveling mechanism swivels the gantry and the moving mechanism moves the radiation detector, thereby to set the radiation detector close to the subject lying on a bed located adjacent to the gantry.

24. An apparatus according to claim 22, wherein the detector is provided, movable along an axis of the subject.

25. A nuclear medical diagnostic apparatus comprising:
at least one detector for detecting gamma rays emitted from radioisotope injected into a subject;
a processor for generating a distribution of the radioisotope on the basis of an output of the detector; and
a rotating ring supporting the detector such that the detector is movable in a circumferential direction of the rotating ring, wherein the detector is mounted on the rotating ring such that the detector is located on an inner side in a radial direction of the rotating ring, and a center of gravity of the detector is located on an inner side in a direction parallel to a rotation axis of the rotating ring.

26. An apparatus according to claim 25, which further comprises at least one attachment provided on the rotating ring, securing the detector detachably to the rotating ring.

27. A nuclear medical diagnostic apparatus comprising:
at least one detector for detecting gamma rays emitted from radioisotope injected into a subject;
a processor for generating a distribution of the radioisotope on the basis of an output of the detector; and
a rotating ring supporting the detector such that the detector is movable in a circumferential direction of the rotating ring, which further comprises at least one sliding base, the detector being mounted on the rotating ring, with said at least one sliding base interposed therebetween.

28. An apparatus according to claim 27, wherein said at least one sliding base is selectively held in a free rotating state or a locked state with respect to the rotating ring.

29. An apparatus according to claim 28, wherein when said at least one sliding base is held in the free rotating state, the detector is shifted relative to the rotating ring by rotation thereof.

30. An apparatus according to claim 28, which further comprises a plurality of lock structures provided on the rotating ring and spaced apart from one another, the sliding base being locked at any desired one of the lock structures.

31. A nuclear medical diagnostic apparatus comprising:
a detector for detecting gamma rays emitted from radioisotope injected into a subject;
a processor for generating a distribution of the radioisotope on the basis of an output of the detector;
a rotating ring supporting the detector; and
a pantograph structure provided between the detector and the rotating ring, and allowed to be expanded and contracted to change a distance between the detector and the subject.

32. A nuclear medical diagnostic apparatus comprising:
a detector for detecting gamma rays emitted from radioisotope injected into a subject;
a processor for generating a distribution of the radioisotope on the basis of an output of the detector;
a rotating ring supporting the detectors; and
a sliding mechanism provided between the detector and the rotating ring, allowing the detector to be slid in a direction parallel to a rotation axis of the rotating ring.

33. The apparatus according to claim 32, further comprising a turn mechanism provided between the detector and the rotating ring with the sliding mechanism, allowing the detector to be turned.

34. A nuclear medical diagnostic apparatus comprising:
a detector for detecting gamma rays emitted from radioisotope injected into a subject;
a processor for generating a distribution of the radioisotope on the basis of an output of the detector;
a rotating ring supporting the detector; and
a turning mechanism between the detector and the rotating ring, allowing the detector to be turned.

35. A nuclear medical diagnostic apparatus comprising:
at least one radiation detector for detecting radiation emitted from radio isotope injected to a subject;
a gantry supporting said at least one radiation detector; and
a swiveling mechanism for swiveling the gantry.

36. The apparatus according to claim 35, wherein the gantry is movable along an axis of the subject.

37. A nuclear medical diagnostic apparatus comprising:
at least one radiation detector for detecting radiation emitted from radioisotope injected into a subject;
a rotating ring supporting said at least one radiation detector; and
a tilt mechanism for mechanism tilting the rotating ring.

38. The apparatus according to claim 37, wherein the rotating ring is movable along an axis of the subject.

* * * * *